(12) United States Patent
Ding

(10) Patent No.: US 10,764,132 B2
(45) Date of Patent: Sep. 1, 2020

(54) SCALE-OUT ASSOCIATION METHOD AND APPARATUS, AND SYSTEM

(71) Applicant: HUAWEI TECHNOLOGIES CO., LTD., Shenzhen (CN)

(72) Inventor: Yanghua Ding, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 112 days.

(21) Appl. No.: 15/941,003

(22) Filed: Mar. 30, 2018

(65) Prior Publication Data

US 2018/0227179 A1 Aug. 9, 2018

Related U.S. Application Data

(63) Continuation of application No. PCT/CN2015/091313, filed on Sep. 30, 2015.

(51) Int. Cl.
*H04L 12/24* (2006.01)
*H04L 12/26* (2006.01)
(Continued)

(52) U.S. Cl.
CPC ...... *H04L 41/0816* (2013.01); *G06F 9/45558* (2013.01); *G06F 9/5077* (2013.01);
(Continued)

(58) Field of Classification Search
CPC .............. G06F 9/45558; G06F 9/5077; G06F 2209/5022; H04L 41/0896; H04L 41/0816; H04L 43/16; H04L 43/08; H04L 47/822
See application file for complete search history.

(56) References Cited

U.S. PATENT DOCUMENTS 5,151,899 A * 9/1992 Thomas ................ H04L 1/1835
370/394
7,571,343 B1 * 8/2009 Xiang ................ H04L 63/0272
709/203
(Continued)

FOREIGN PATENT DOCUMENTS

CN 104468162 A 3/2015
CN 104468304 A 3/2015
(Continued)

OTHER PUBLICATIONS

European Patent Office search opinion for application EP 15 905 109, dated Aug. 1, 2018, 8 pages. (Year: 2018).*
(Continued)

*Primary Examiner* — George C Neurauter, Jr.
(74) *Attorney, Agent, or Firm* — Kilpatrick Townsend & Stockton LLP

(57) ABSTRACT

Embodiments of the present invention provide a scale-out association method and apparatus, so as to implement a scale-out association operation between VNFs. After initiating a scale-out, a first VNF sends a scale-out notification message to a second VNF that is directly associated with the first VNF. The scale-out notification message of the first VNF carries a scale-out magnitude parameter of the first VNF. The second VNF determines, according to the scale-out magnitude parameter of the first VNF and a service processing capability of the second VNF, whether the second VNF needs to be scaled out. If it is determined the second VNF needs to be scaled out, then the second VNF sends a scale-out request message to a VNFM.

14 Claims, 11 Drawing Sheets

```
┌─────────────────────────────────────────────────────────┐
│ A second VNF receives a scale-out notification message  │
│ of a first VNF, where the scale-out notification        │   S101
│ message of the first VNF carries a scale-out magnitude  │
│ parameter of the first VNF, the scale-out magnitude     │
│ parameter of the first VNF is used by the second VNF to │
│ determine whether the second VNF needs to be scaled     │
│ out, and the first VNF is directly associated with the  │
│ second VNF                                              │
└─────────────────────────────────────────────────────────┘
                            │
                            ▼
┌─────────────────────────────────────────────────────────┐
│ The second VNF determines, according to the scale-out   │   S102
│ magnitude parameter of the first VNF and a service      │
│ processing capability of the second VNF, whether the    │
│ second VNF needs to be scaled out                       │
└─────────────────────────────────────────────────────────┘
                            │
                            ▼
┌─────────────────────────────────────────────────────────┐
│ If the second VNF determines that the second VNF needs  │   S103
│ to be scaled out, the second VNF sends a scale-out      │
│ request message to a VNFM, where the scale-out request  │
│ message is used to request to scale out the second VNF  │
└─────────────────────────────────────────────────────────┘
```

(51) Int. Cl.
    *G06F 9/455*     (2018.01)
    *G06F 9/50*      (2006.01)
    *H04L 12/911*    (2013.01)

(52) U.S. Cl.
    CPC ...... *H04L 41/0823* (2013.01); *H04L 41/0896* (2013.01); *H04L 43/08* (2013.01); *H04L 43/16* (2013.01); *H04L 47/822* (2013.01); *G06F 2209/5022* (2013.01)

(56) References Cited

U.S. PATENT DOCUMENTS

| | | | |
|---|---|---|---|
| 8,954,992 B2* | 2/2015 | Campbell | H04L 49/109 719/313 |
| 9,973,375 B2* | 5/2018 | Shatzkamer | G06F 9/455 |
| 9,979,602 B1* | 5/2018 | Chinnakannan | H04L 41/12 |
| 10,057,109 B2* | 8/2018 | Shatzkamer | G06F 9/455 |
| 10,263,911 B2* | 4/2019 | Xiang | H04L 47/781 |
| 10,320,649 B2* | 6/2019 | Chen | H04W 24/04 |
| 10,397,132 B2* | 8/2019 | Xia | |
| 2014/0082612 A1 | 3/2014 | Breitgand et al. | |
| 2016/0205004 A1* | 7/2016 | Chou | H04L 43/08 709/224 |
| 2016/0205033 A1 | 7/2016 | Wang et al. | |
| 2016/0321112 A1 | 11/2016 | Iwashina et al. | |
| 2016/0335111 A1* | 11/2016 | Bruun | G06F 9/45558 |
| 2016/0344640 A1* | 11/2016 | Soderlund | H04L 47/2483 |
| 2017/0150399 A1* | 5/2017 | Kedalagudde | H04W 28/08 |
| 2017/0177396 A1* | 6/2017 | Palermo | G06F 9/45558 |
| 2017/0264500 A1* | 9/2017 | Koizumi | G06F 9/46 |
| 2018/0024852 A1* | 1/2018 | Yabushita | G06F 9/45558 718/1 |
| 2018/0205786 A1* | 7/2018 | Dong | H04L 67/1034 |
| 2018/0241630 A1* | 8/2018 | Andrianov | H04L 41/0896 |
| 2018/0262410 A1* | 9/2018 | Chou | G06F 9/45558 |
| 2018/0351824 A1* | 12/2018 | Giust | G06F 9/542 |
| 2019/0052528 A1* | 2/2019 | Yoshimura | H04L 41/0813 |
| 2019/0171492 A1* | 6/2019 | Yousaf | G06F 9/5061 |
| 2019/0253264 A1* | 8/2019 | Singaravelu | H04L 9/0827 |

FOREIGN PATENT DOCUMENTS

| | | | | |
|---|---|---|---|---|
| CN | 104601492 A | 5/2015 | | |
| CN | 104811328 A | 7/2015 | | |
| WO | 2014125486 A1 | 8/2014 | | |
| WO | 2015126430 A1 | 6/2015 | | |
| WO | 2015099035 A1 | 7/2015 | | |
| WO | 2015110083 A1 | 7/2015 | | |
| WO | 2015131671 A1 | 9/2015 | | |
| WO | WO-2016070559 A1 * | 5/2016 | ............ | H04L 41/00 |
| WO | WO-2016101597 A1 * | 6/2016 | ............ | G06F 9/455 |
| WO | WO-2016165470 A1 * | 10/2016 | | |

OTHER PUBLICATIONS

3rd Generation Partnership Project; Technical Specification Group Services and System Aspects; Telecommunication management; Study on network management of virtualized networks (Release 13), 3GPP TR 32.842, vol. SA WGS, No. V13.0.0, Sep. 25, 2015, pp. 1-84, XP050996350.

Huawei:"Mobile Networks End to End VNF life cycle management procedures", S5-152291, vol. SA WGS, No. Dubrovnik; Apr. 15, 2015, XP050944844, 21 pages.

Spirent Communications: Chapter 7.1.3—VNF Scaling; NFVTST(15)000125r1 , European Telecommunications Standards Institute (ETSI), Sep. 8, 2015, pp. 1-7, XP014256867.

China Mobile et al.: "Add use case of VNF scaling to target capacity initiated by EM",S5-152352D1 PCR TR 32.842 ,vol. SA WGS, No. Dubrovnik (Croatia); May 14, 2015, XP050966973, 3 pages.

"Network Functions Virtualisation (NFV); Virtual Network Functions Architecture", Group Specification, European Telecommunications Standards Institute (ETSI), vol. NFV SWA, No. V1.1.1, Dec. 1, 2014, XP014235735, 93 pages.

ETSI GS NFV-MAN 001 V1.1.1 (Dec. 2014),Network Functions Virtualisation (NFV);Management and Orchestration, dated Dec. 2014, total 184 pages.

* cited by examiner ly associated with the VNF.

SCALE-OUT ASSOCIATION METHOD AND APPARATUS, AND SYSTEM

CROSS-REFERENCE TO RELATED APPLICATIONS

This application is a continuation of International Application No. PCT/CN2015/091313, filed on Sep. 30, 2015, the disclosure of which is hereby incorporated by reference in its entirety.

TECHNICAL FIELD

The present invention relates to the field of communications technologies, and in particular, to a scale-out association method and apparatus, and a system.

BACKGROUND

As virtualization technologies develop rapidly, network functions virtualization (NFV) gradually gains attention from people. In an NFV system, a VNF instance can run on a general-purpose physical device by implementing instantiation of a virtualized network function (VNF), thereby implementing a dedicated function of a network element device in a network by using the general-purpose physical device.

A virtualized network function manager (VNFM) exists in the NFV system, and can perform life cycle management on a VNF in the NFV system, for example, perform an operation such as instantiation, scale-out, or termination on the VNF in the NFV system. When load of a VNF in the NFV system exceeds a load threshold because of an increase in a user quantity or data traffic of the VNF, the VNF can initiate a scale-out operation. That is, the VNF determines, according to the increased user quantity or data traffic, resources that need to be added to the VNF, and sends a scale-out request message to a MANO, to request the MANO to scale out the VNF, that is, to request the MANO to allocate, to the VNF, the resources requested to be added to the VNF.

In the NFV system, multiple VNFs may be members of a same network service (NS), that is, the multiple VNFs are functionally associated with each other. After a VNF is scaled out, the VNF generates more data traffic because a service processing capability of the VNF is enhanced. Therefore, if a service processing capability of a VNF directly associated with the VNF is not sufficient for processing in time the data traffic generated by the VNF, the VNF has service impact on the VNF directly associated with the VNF, and a service call loss is caused to the VNF directly associated with the VNF.

SUMMARY

The present invention provides a scale-out association method and apparatus, and a system, so as to implement a scale-out association operation between VNFs, thereby avoiding service impact caused by scale-out of a VNF to a VNF directly associated with the VNF, and further reducing a service call loss.

To achieve the foregoing objectives, the following technical solutions are used in the present invention:

According to a first aspect, the present invention provides a scale-out association method, including:

receiving, by a second virtualized network function VNF, a scale-out notification message of a first VNF, where the scale-out notification message of the first VNF carries a scale-out magnitude parameter of the first VNF, the scale-out magnitude parameter of the first VNF is used by the second VNF to determine whether the second VNF needs to be scaled out, and the first VNF is directly associated with the second VNF;

determining, by the second VNF according to the scale-out magnitude parameter of the first VNF and a service processing capability of the second VNF, whether the second VNF needs to be scaled out; and sending, by the second VNF, a scale-out request message to a virtualized network function manager VNFM if the second VNF determines that the second VNF needs to be scaled out, where the scale-out request message is used to request to scale out the second VNF.

In a first possible implementation of the first aspect, the scale-out magnitude parameter of the first VNF is used to indicate an increased service capacity of the first VNF after the first VNF is scaled out.

With reference to the first aspect or the first possible implementation of the first aspect, in a second possible implementation, if the second VNF determines that the second VNF needs to be scaled out, the method further includes:

obtaining, by the second VNF, a scale-out parameter of the second VNF according to the scale-out magnitude parameter of the first VNF, where the scale-out parameter indicates a resource that needs to be added to the second VNF; and the scale-out request message carries the scale-out parameter of the second VNF.

In the present invention, the second VNF can directly obtain the scale-out parameter, including a quantity and types of VMs that need to be added, and the like, of the second VNF by means of conversion according to the scale-out magnitude parameter of the first VNF, and the second VNF adds the scale-out parameter to the scale-out request message and sends the scale-out request message to the VNFM, so that the VNFM adds, to the second VNF according to the scale-out parameter, a resource that needs to be added.

With reference to any one of the first aspect, or the first and the second possible implementations of the first aspect, in a third possible implementation, the determining, by the second VNF according to the scale-out magnitude parameter of the first VNF and a service processing capability of the second VNF, whether the second VNF needs to be scaled out includes:

determining, by the second VNF, whether the service processing capability of the second VNF satisfies the scale-out magnitude parameter of the first VNF; and if the service processing capability of the second VNF satisfies the scale-out magnitude parameter of the first VNF, determining, by the second VNF, that the second VNF does not need to be scaled out; or if the service processing capability of the second VNF does not satisfy the scale-out magnitude parameter of the first VNF, determining, by the second VNF, that the second VNF needs to be scaled out.

With reference to any one of the first aspect, or the first to the third possible implementations of the first aspect, in a fourth possible implementation, the receiving, by a second VNF, a scale-out notification message of a first VNF includes:

receiving, by the second VNF, the scale-out notification message of the first VNF sent by a network functions virtualization orchestrator NFVO.

With reference to the fourth possible implementation of the first aspect, in a fifth possible implementation, the scale-out request message carries a scale-out magnitude parameter of the second VNF, the scale-out magnitude parameter of the second VNF is determined by the second VNF according to the scale-out magnitude parameter of the first VNF, and the scale-out magnitude parameter of the second VNF is used to indicate an increased service capacity of the second VNF after the second VNF is scaled out.

With reference to any one of the first aspect, or the first to the third possible implementations of the first aspect, in a sixth possible implementation, the receiving, by a second VNF, a scale-out notification message of a first VNF includes:

receiving, by the second VNF, the scale-out notification message of the first VNF sent by the first VNF.

With reference to the sixth possible implementation of the first aspect, in a seventh possible implementation, after the sending, by the second VNF, a scale-out request message if the second VNF determines that the second VNF needs to be scaled out, the method further includes:

sending, by the second VNF, a scale-out notification message of the second VNF to a fourth VNF directly associated with the second VNF, where the scale-out notification message of the second VNF carries the scale-out magnitude parameter of the second VNF, the scale-out magnitude parameter of the second VNF is determined by the second VNF according to the scale-out magnitude parameter of the first VNF, and the scale-out magnitude parameter of the second VNF is used by the fourth VNF to determine whether the fourth VNF needs to be scaled out.

In the seventh possible implementation, after performing associated scale-out according to scale-out of the first VNF, the second VNF sends the scale-out notification message of the second VNF to the fourth VNF directly associated with the second VNF, so that the fourth VNF can also perform an associated scale-out operation according to scale-out of the second VNF, thereby implementing network-wide scale-out on a network on which the second VNF is located.

With reference to any one of the first aspect, or the first to the seventh possible implementations of the first aspect, in an eighth possible implementation, the scale-out notification message of the first VNF further carries an identifier of the first VNF and a scale-out sequence number identifier of the first VNF, and the method further includes:

determining, by the second VNF, whether another scale-out notification message carrying the identifier of the first VNF and the scale-out sequence number identifier of the first VNF has been received; and if the another scale-out notification message has not been received, performing the step of determining, by the second VNF according to the scale-out magnitude parameter of the first VNF and a service processing capability of the second VNF, whether the second VNF needs to be scaled out.

In the eighth possible implementation, the second VNF may determine, according to the identifier of the first VNF and the scale-out sequence number identifier of the first VNF that are carried in the scale-out notification message of the first VNF, whether to repeatedly receive the scale-out notification message of the first VNF, so as to avoid a waste of resources caused because associated scale-out is performed for multiple times after the second VNF receives the scale-out notification message of the first VNF for multiple times.

With reference to the eighth possible implementation of the first aspect, in a ninth possible implementation, the scale-out request message sent by the second VNF to the VNFM or the scale-out notification message of the second VNF sent by the second VNF to the fourth VNF further carries an identifier of the second VNF and a scale-out sequence number identifier of the second VNF.

According to a second aspect, the present invention provides a scale-out association method, including:

receiving, by a network functions virtualization orchestrator NFVO, a resource request message of a first virtualized network function VNF, where the resource request message of the first VNF carries an identifier of the first VNF and a scale-out magnitude parameter of the first VNF;

determining, by the NFVO according to the identifier of the first VNF, a second VNF directly associated with the first VNF; and sending, by the NFVO, a scale-out notification message of the first VNF to the second VNF, where the scale-out notification message of the first VNF carries the scale-out magnitude parameter of the first VNF, and the scale-out magnitude parameter of the first VNF is used by the second VNF to determine whether the second VNF needs to be scaled out.

In a first possible implementation of the second aspect, the determining, by the NFVO according to the identifier of the first VNF, a second VNF directly associated with the first VNF includes:

querying, by the NFVO according to the identifier of the first VNF, a preset association list for the second VNF directly associated with the first VNF.

With reference to the second aspect or the first possible implementation of the second aspect, in a second possible implementation, the resource request message of the first VNF further carries a scale-out sequence number identifier of the first VNF.

With reference to the second possible implementation of the second aspect, in a third possible implementation, the scale-out notification message of the first VNF further carries the scale-out sequence number identifier of the first VNF, and the scale-out sequence number identifier of the first VNF is used by the second VNF to determine whether another scale-out notification message carrying the scale-out sequence number identifier of the first VNF has been received.

In the third possible implementation of the second aspect, the scale-out sequence number identifier of the first VNF is added to the scale-out notification message of the first VNF and sent to the second VNF, so that the second VNF determines, according to the identifier of the first VNF and the scale-out sequence number identifier of the first VNF, whether to repeatedly receive the scale-out notification message of the first VNF, so as to avoid a waste of resources caused because associated scale-out is performed for multiple times after the second VNF receives the scale-out notification message of the first VNF for multiple times.

According to a third aspect, the present invention provides a scale-out association method, including:

receiving, by a network functions virtualization orchestrator NFVO, a resource request message of a first virtualized network function VNF, where the resource request message of the first VNF carries an identifier of the first VNF and a scale-out magnitude parameter of the first VNF;

determining, by the NFVO according to a preset correspondence between an identifier of a VNF and a scale-out association script, a scale-out association script corresponding to the identifier of the first VNF, where the scale-out association script corresponding to the identifier of the first VFN is used to scale out a VNF that is among VNFs directly associated with the first VNF and that needs to be scaled out; and running, by the NFVO according to the scale-out magnitude parameter of the first VNF, the scale-out association script corresponding to the identifier of the first VFN.

In the method provided in the third aspect, after determining to scale out a first VNF, an NFVO can directly implement, according to a preset scale-out association script, a scale-out operation on a VNF directly associated with the first VNF, thereby enhancing a service processing capability of the VNF directly associated with the first VNF, to ensure that the service processing capability of the VNF directly associated with the first VNF is sufficient for processing in time data traffic that is generated by the first VNF after scale-out, avoiding service impact caused by the scale-out of the first VNF to the VNF directly associated with the first VNF, and further reducing a service call loss.

In a first possible implementation of the third aspect, the scale-out magnitude parameter of the first VNF is used to indicate an increased service capacity of the first VNF after the first VNF is scaled out.

With reference to the third aspect or the first possible implementation of the third aspect, in a second possible implementation, the resource request message of the first VNF further carries a scale-out sequence number identifier of the first VNF; and the NFVO determines whether another resource request message carrying the identifier of the first VNF and the scale-out sequence number identifier of the first VNF has been received, and if the another resource request message has not been received, performs the step of determining, by the NFVO according to a preset correspondence between an identifier of a VNF and a scale-out association script, a scale-out association script corresponding to the identifier of the first VNF.

In the second possible implementation of the third aspect, the NFVO can determine, by using the identifier of the first VNF and the scale-out sequence number identifier of the first VNF, whether to repeatedly receive the resource request message of the first VNF, so as to prevent the NFVO from running, for multiple times after receiving the resource request message of the first VNF for multiple times, the scale-out association script corresponding to the identifier of the first VNF to perform associated scale-out on another VNF directly associated with the first VNF.

According to a fourth aspect, the present invention provides a scale-out association apparatus, including:

a receiving unit, configured to receive a scale-out notification message of a first virtualized network function VNF, where the scale-out notification message of the first VNF carries a scale-out magnitude parameter of the first VNF, the scale-out magnitude parameter of the first VNF is used by a determining unit to determine whether a second VNF needs to be scaled out, and the first VNF is directly associated with the second VNF;

the processing unit, configured to determine, according to the scale-out magnitude parameter of the first VNF received by the receiving unit and a service processing capability of the second VNF, whether the second VNF needs to be scaled out; and a sending unit, configured to send a scale-out request message to a virtualized network function manager VNFM if the processing unit determines that the second VNF needs to be scaled out, where the scale-out request message is used to request to scale out the second VNF.

In a first possible implementation of the fourth aspect, the scale-out magnitude parameter of the first VNF received by the receiving unit is used to indicate an increased service capacity of the first VNF after the first VNF is scaled out.

With reference to the fourth aspect or the first possible implementation of the fourth aspect, in a second possible implementation, the processing unit is further configured to obtain a scale-out parameter of the second VNF according to the scale-out magnitude parameter of the first VNF if the processing unit determines that the second VNF needs to be scaled out, where the scale-out parameter indicates a resource that needs to be added to the second VNF; and the scale-out request message sent by the sending unit carries the scale-out parameter of the second VNF.

With reference to any one of the fourth aspect, or the first and the second possible implementations of the fourth aspect, in a third possible implementation, the processing unit is specifically configured to: determine whether the service processing capability of the second VNF satisfies the scale-out magnitude parameter of the first VNF; and if the service processing capability of the second VNF satisfies the scale-out magnitude parameter of the first VNF, determine that the second VNF does not need to be scaled out; or if the service processing capability of the second VNF does not satisfy the scale-out magnitude parameter of the first VNF, determine that the second VNF needs to be scaled out.

With reference to any one of the fourth aspect, or the first to the third possible implementations of the fourth aspect, in a fourth possible implementation, the receiving unit is specifically configured to receive the scale-out notification message of the first VNF sent by a network functions virtualization orchestrator NFVO.

With reference to the fourth possible implementation of the fourth aspect, in a fifth possible implementation, the scale-out request message sent by the sending unit carries a scale-out magnitude parameter of the second VNF, the scale-out magnitude parameter of the second VNF is determined by the processing unit according to the scale-out magnitude parameter of the first VNF, and the scale-out magnitude parameter of the second VNF is used to indicate an increased service capacity of the second VNF after the second VNF is scaled out.

With reference to any one of the fourth aspect, or the first to the third possible implementations of the fourth aspect, in a sixth possible implementation, the receiving unit is specifically configured to receive the scale-out notification message of the first VNF sent by the first VNF.

With reference to the sixth possible implementation of the fourth aspect, in a seventh possible implementation, the sending unit is further configured to: after the sending unit sends the scale-out request message, send a scale-out notification message of the second VNF to a fourth VNF directly associated with the second VNF, where the scale-out notification message of the second VNF carries the scale-out magnitude parameter of the second VNF, the scale-out magnitude parameter of the second VNF is determined by the determining unit according to the scale-out magnitude parameter of the first VNF, and the scale-out magnitude parameter of the second VNF is used by the fourth VNF to determine whether the fourth VNF needs to be scaled out.

With reference to any one of the fourth aspect, or the first to the seventh possible implementations of the fourth aspect, in an eighth possible implementation, the processing unit is further configured to: determine whether another scale-out notification message carrying an identifier of the first VNF and a scale-out sequence number identifier of the first VNF has been received; and if the another scale-out notification message has not been received, perform the step of determining, according to the scale-out magnitude parameter of the first VNF and a service processing capability of the second VNF, whether the second VNF needs to be scaled out.

With reference to the eighth possible implementation of the fourth aspect, in a ninth possible implementation, the scale-out request message sent by the sending unit to the VNFM or the scale-out notification message of the second VNF sent by the sending unit to the fourth VNF further carries an identifier of the second VNF and a scale-out sequence number identifier of the second VNF.

According to a fifth aspect, the present invention provides an NFVO, including:

a receiving unit, configured to receive a resource request message of a first virtualized network function VNF, where the resource request message of the first VNF carries an identifier of the first VNF and a scale-out magnitude parameter of the first VNF;

a determining unit, configured to determine, according to the identifier of the first VNF received by the receiving unit, a second VNF directly associated with the first VNF; and a sending unit, configured to send a scale-out notification message of the first VNF to the second VNF, where the scale-out notification message of the first VNF carries the scale-out magnitude parameter of the first VNF received by the receiving unit, and the scale-out magnitude parameter of the first VNF is used by the second VNF to determine whether the second VNF needs to be scaled out.

In a first possible implementation of the fifth aspect, the determining unit is specifically configured to query, according to the identifier of the first VNF, a preset association list for the second VNF directly associated with the first VNF.

With reference to the fifth aspect or the first possible implementation of the fifth aspect, in a second possible implementation, the resource request message of the first VNF received by the receiving unit further carries a scale-out sequence number identifier of the first VNF.

With reference to the second possible implementation of the fifth aspect, in a third possible implementation, the scale-out notification message of the first VNF sent by the sending unit further carries the scale-out sequence number identifier of the first VNF, and the scale-out sequence number identifier of the first VNF is used by the second VNF to determine whether another scale-out notification message carrying the scale-out sequence number identifier of the first VNF has been received.

According to a sixth aspect, the present invention provides an NFVO, including:

a receiving unit, configured to receive a resource request message of a first virtualized network function VNF, where the resource request message of the first VNF carries an identifier of the first VNF and a scale-out magnitude parameter of the first VNF;

a determining unit, configured to determine, according to a preset correspondence between an identifier of a VNF and a scale-out association script, a scale-out association script corresponding to the identifier of the first VNF received by the receiving unit, where the scale-out association script corresponding to the identifier of the first VFN is used to scale out a VNF that is among VNFs directly associated with the first VNF and that needs to be scaled out; and a running unit, configured to run, according to the scale-out magnitude parameter of the first VNF received by the receiving unit, the scale-out association script that is determined by the determining unit and that corresponds to the identifier of the first VFN.

In a first possible implementation of the sixth aspect, the scale-out magnitude parameter of the first VNF received by the receiving unit is used to indicate an increased service capacity of the first VNF after the first VNF is scaled out.

With reference to the sixth aspect or the first possible implementation of the sixth aspect, in a second possible implementation, the resource request message of the first VNF received by the receiving unit further carries a scale-out sequence number identifier of the first VNF; and the determining unit is further configured to: determine whether the receiving unit has received a resource request message carrying the identifier of the first VNF and the scale-out sequence number identifier of the first VNF; and if the another resource request message has not been received, perform the step of determining, according to a preset correspondence between an identifier of a VNF and a scale-out association script, a scale-out association script corresponding to the identifier of the first VNF.

According to a seventh aspect, the present invention provides a scale-out association apparatus, including:

a processor, configured to receive a scale-out notification message of a first VNF, where the scale-out notification message of the first VNF carries a scale-out magnitude parameter of the first VNF, the scale-out magnitude parameter of the first VNF is used by the processor to determine whether a second VNF needs to be scaled out, and the first VNF is directly associated with the second VNF, where the processor is further configured to: determine, according to the scale-out magnitude parameter of the first VNF and a service processing capability of the second VNF, whether the second VNF needs to be scaled out, and send a scale-out request message to a virtualized network function manager VNFM if the processor determines that the second VNF needs to be scaled out, where the scale-out request message is used to request to scale out the second VNF.

In a first possible implementation of the seventh aspect, the scale-out magnitude parameter of the first VNF received by the processor is used to indicate an increased service capacity of the first VNF after the first VNF is scaled out.

With reference to the seventh aspect or the first possible implementation of the seventh aspect, in a second possible implementation, the processor is further configured to obtain a scale-out parameter of the second VNF according to the scale-out magnitude parameter of the first VNF if the processor determines that the second VNF needs to be scaled out, where the scale-out parameter indicates a resource that needs to be added to the second VNF; and the scale-out request message carries the scale-out parameter of the second VNF.

With reference to any one of the seventh aspect, or the first and the second possible implementations of the seventh aspect, in a third possible implementation, the processor is specifically configured to: determine whether the service processing capability of the second VNF satisfies the scale-out magnitude parameter of the first VNF; and if the service processing capability of the second VNF satisfies the scale-out magnitude parameter of the first VNF, determine that the second VNF does not need to be scaled out; or if the service processing capability of the second VNF does not satisfy the scale-out magnitude parameter of the first VNF, determine that the second VNF needs to be scaled out.

With reference to any one of the seventh aspect, or the first to the third possible implementations of the seventh aspect, in a fourth possible implementation, the processor is specifically configured to receive the scale-out notification message of the first VNF sent by a network functions virtualization orchestrator NFVO.

With reference to the fourth possible implementation of the seventh aspect, in a fifth possible implementation, the scale-out request message sent by the processor carries a scale-out magnitude parameter of the second VNF, the scale-out magnitude parameter of the second VNF is determined by the processor according to the scale-out magnitude parameter of the first VNF, and the scale-out magnitude parameter of the second VNF is used to indicate an increased service capacity of the second VNF after the second VNF is scaled out.

With reference to any one of the seventh aspect, or the first to the third possible implementations of the seventh aspect, in a sixth possible implementation, the processor is specifically configured to receive the scale-out notification message of the first VNF sent by the first VNF.

With reference to the sixth possible implementation of the seventh aspect, in a seventh possible implementation, the processor is further configured to: after sending the scale-out request message, send a scale-out notification message of the second VNF to a fourth VNF directly associated with the second VNF, where the scale-out notification message of the second VNF carries the scale-out magnitude parameter of the second VNF, the scale-out magnitude parameter of the second VNF is determined by the processor according to the scale-out magnitude parameter of the first VNF, and the scale-out magnitude parameter of the second VNF is used by the fourth VNF to determine whether the fourth VNF needs to be scaled out.

With reference to any one of the seventh aspect, or the first to the seventh possible implementations of the seventh aspect, in an eighth possible implementation, the processor is further configured to: determine whether another scale-out notification message carrying an identifier of the first VNF and a scale-out sequence number identifier of the first VNF has been received; and if the another scale-out notification message has not been received, perform the step of determining, according to the scale-out magnitude parameter of the first VNF and a service processing capability of the second VNF, whether the second VNF needs to be scaled out.

With reference to the eighth possible implementation of the seventh aspect, in a ninth possible implementation, the scale-out request message sent by the processor to the VNFM or the scale-out notification message of the second VNF sent by the processor to the fourth VNF further carries an identifier of the second VNF and a scale-out sequence number identifier of the second VNF.

According to an eighth aspect, the present invention provides an NFVO, including:

a processor, configured to: receive a resource request message of a first virtualized network function VNF, where the resource request message of the first VNF carries an identifier of the first VNF and a scale-out magnitude parameter of the first VNF; determine, according to the identifier of the first VNF, a second VNF directly associated with the first VNF; and send a scale-out notification message of the first VNF to the second VNF, where the scale-out notification message of the first VNF carries the scale-out magnitude parameter of the first VNF, the scale-out magnitude parameter of the first VNF is used by the second VNF to determine whether the second VNF needs to be scaled out, and the first VNF is a VNF initiating a scale-out operation.

In a first possible implementation of the eighth aspect, the processor is specifically configured to query, according to the identifier of the first VNF, a preset association list for the second VNF directly associated with the first VNF.

With reference to the eighth aspect or the first possible implementation of the eighth aspect, in a second possible implementation, the resource request message of the first VNF received by the processor further carries a scale-out sequence number identifier of the first VNF.

With reference to the second possible implementation of the eighth aspect, in a third possible implementation, the scale-out notification message of the first VNF sent by the processor further carries the scale-out sequence number identifier of the first VNF, and the scale-out sequence number identifier of the first VNF is used by the second VNF to determine whether another scale-out notification message carrying the scale-out sequence number identifier of the first VNF has been received.

According to a ninth aspect, the present invention provides an NFVO, including:

a processor, configured to: receive a resource request message of a first VNF, where the resource request message of the first VNF carries an identifier of the first VNF and a scale-out magnitude parameter of the first VNF; determine, according to a preset correspondence between an identifier of a VNF and a scale-out association script, a scale-out association script corresponding to the identifier of the first VNF; and run, according to the scale-out magnitude parameter of the first VNF, the scale-out association script corresponding to the identifier of the first VFN, where the first VNF is a VNF proactively initiating a scale-out operation, and the scale-out association script corresponding to the identifier of the first VFN is used to scale out a VNF that is among VNFs directly associated with the first VNF and that needs to be scaled out.

In a first possible implementation of the ninth aspect, the scale-out magnitude parameter of the first VNF received by the processor is used to indicate an increased service capacity of the first VNF after the first VNF is scaled out.

With reference to the ninth aspect or the first possible implementation of the ninth aspect, in a second possible implementation, the resource request message of the first VNF received by the processor further carries a scale-out sequence number identifier of the first VNF; and the processor is further configured to: determine whether a resource request message carrying the identifier of the first VNF and the scale-out sequence number identifier of the first VNF has been received; and if the another resource request message has not been received, perform the step of determining, according to a preset correspondence between an identifier of a VNF and a scale-out association script, a scale-out association script corresponding to the identifier of the first VNF.

According to a tenth aspect, the present invention provides a communications system, including:

the scale-out association apparatus according to any one of the fourth aspect or the implementations of the fourth aspect, and the NFVO according to any one of the fifth aspect or the implementations of the fifth aspect; or the scale-out association apparatus according to any one of the fourth aspect or the implementations of the fourth aspect, and the NFVO according to the sixth aspect or any one of the sixth aspect; or the scale-out association apparatus according to any one of the seventh aspect or the implementations of the seventh aspect, and the NFVO according to any one of the eighth aspect or the implementations of the eighth aspect; or the scale-out association apparatus according to any one of the seventh aspect or the implementations of the seventh aspect, and the NFVO according to the ninth aspect or the any one of the ninth aspect.

Embodiments of the present invention provide a scale-out association method and apparatus, and a system. The method may include: receiving, by a second VNF, a scale-out notification message of a first VNF; determining, according to a scale-out magnitude parameter of the first VNF carried in the scale-out notification message of the first VNF and according to a service processing capability of the second VNF, whether the second VNF needs to be scaled out; and sending, by the second VNF, a scale-out request message to a VNFM if the second VNF determines that the second VNF needs to be scaled out, where the scale-out request message is used to request to scale out the second VNF, the scale-out magnitude parameter of the first VNF is used by the second VNF to determine whether the second VNF needs to be scaled out, and the first VNF is directly associated with the second VNF. According to the method, a second VNF can receive in time a scale-out notification message of a first VNF and learn that the first VFN is to be scaled out. When the second VNF determines, according to a scale-out magnitude parameter of the first VNF, that the second VNF also needs to be scaled out, the second VNF can request a VNFM responsible for managing the second VNF to perform scale-out, thereby enhancing a service processing capability of the second VNF in time to ensure that the service processing capability of the second VNF is sufficient for processing in time data traffic that is generated by the first VNF after scale-out, avoiding service impact caused by the scale-out of the first VNF to the second VNF directly associated with the first VNF, and further reducing a service call loss.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
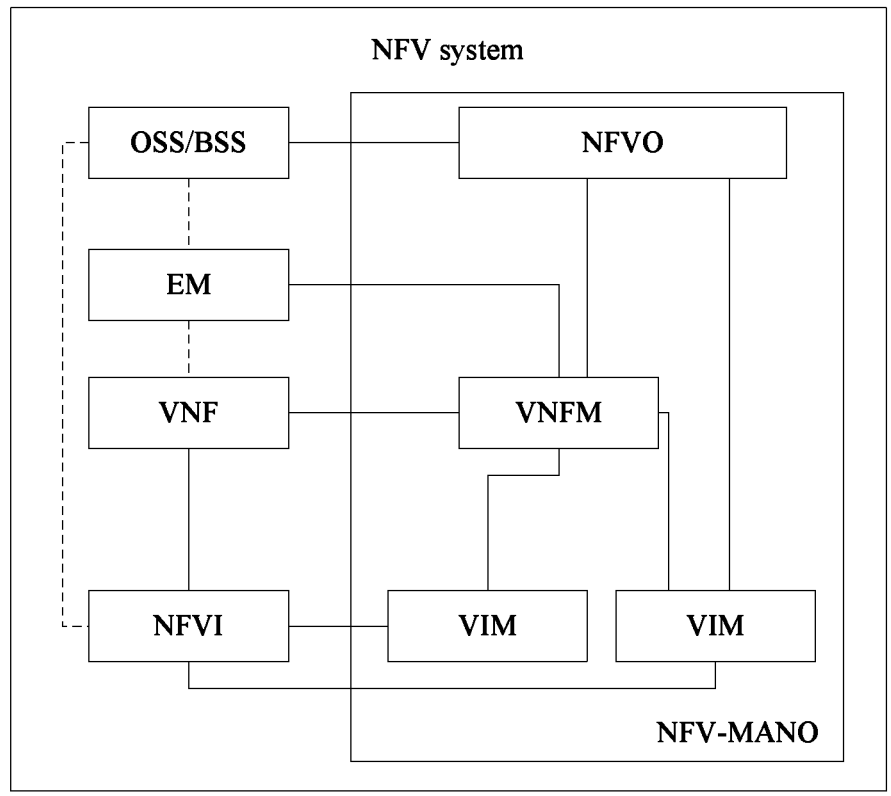
FIG. 1 is an architectural diagram of an existing NFV system.

As shown in FIG. 1, FIG. 1 is an architectural diagram of an NFV system. The NFV system includes function nodes such as a network functions virtualization orchestrator (NFVO), a VNFM, a virtualized infrastructure manager (VIM), an operations support system (OSS) or a business support system (BSS), an element manager (EM), a VNF node, and a network functions virtualization infrastructure (NFVI).

Further, the NFVO, the VNFM, and the VIM in the NFV system form a management and orchestration (NFV-MANO) domain of the NFV system. The NFVO may also be referred to as a network functions virtualization orchestrator.

The NFVO can schedule resources of VIMs, and perform life cycle management of an NS including at least one VNF, for example, perform an operation such as updating, querying, scale-out, or termination on the NS.

The VNFM is responsible for performing life cycle management on a VNF, for example, performing an operation such as instantiation, detection, updating, scale-out, scale-in, or termination on the VNF.

The VIM is responsible for controlling and managing resources in the NFVI infrastructure, including a computing resource, a storage resource, a network resource, and the like.

In the NFV system, when load of a VNF exceeds a preset load threshold, the NFV initiates a scale-out operation. Specifically, the VNF determines, according to an increase in data traffic or a user quantity, a resource that needs to be added to the VNF, for example, types and a quantity of virtual machines (VM) that need to be added. For example, assuming that a quantity of users who need to be served by the VNF increases by 100,000, the VNF determines, according to a service unit of the VNF, that 10 VMs need to be added. After determining the resource that needs to be added to the VNF, the VNF sends a scale-out request message to the VNFM to request the VNFM to scale out the VNF. Specifically, after receiving the scale-out request message sent by the VNF, the VNFM sends a resource reservation request message to the NFVO according to the resource requested to be added to the VNF, to request the NFVO to perform resource reservation for the VNF. After the NFVO completes resource reservation and sends resource reservation information to the VNFM, the VNFM requests a VIM indicated by the resource reservation information to allocate a resource. After the VIM successfully allocates, to the VNF, 10 VMs that are requested to be added to the VNF, the VNFM returns an acknowledgment message to the VNF, thereby completing scale-out of the VNF.

In the prior art, after a VNF in the NFV system is scaled out, another VNF directly associated with the VNF may suffer service impact from the VNF. For example, it is assumed that a VNF1 is directly associated with a VNF2. After the VNF1 is scaled out, a service processing capability of the VNF1 is enhanced. Therefore, data traffic from the VNF1 to the VNF2 is also increased. If a current resource of the VNF2 is not sufficient for processing data from the VNF1 in time, network congestion and excessively high load occur on the VNF2, and the VNF2 fails to process a service request from the VNF1. That is, the VNF2 suffers service impact from the VNF1, and a service call loss occurs on the VNF2.

An embodiment of the present invention provides a scale-out association method, so as to implement a scale-out association operation between VNFs, thereby avoiding service impact caused by scale-out of a VNF to a VNF directly associated with the VNF, and further reducing a service call loss.

It should be noted that in the embodiments of the present invention, any function node in the foregoing NFV system may be implemented by using one physical device, or may be jointly implemented by using multiple physical devices; and multiple function nodes in the NFV system may be respectively implemented by using different physical devices, or may be implemented by using a same physical device. It may be understood that any function node in the NFV system may be a logical function module in a physical device, or may be a logical function module including multiple physical devices.

Therefore, in the following embodiments of the present invention, one physical device may perform steps of methods provided in the embodiments of the present invention, or multiple physical devices may cooperatively perform steps of methods provided in the embodiments of the present invention. This is not limited in the present invention.

Further, to more clearly describe the scale-out association method provided in the present invention, the following uses a logical function module as an execution body for description. A person skilled in the art may understand that during specific implementation, the logical function module needs to rely on a hardware resource on a physical device on which the logical function module is located.

In the embodiments of the present invention, the NFV system may be applied to a Global System for Mobile Communications (GSM) or a Long Term Evolution (LTE) communications system, may be applied to an LTE evolved communications system, for example, an LTE-A (long term evolution advanced) system, or may be applied to a third generation (3G) mobile communications system, such as a WCDMA system. This is not limited in the present invention.

Embodiment 1

Figure 2:
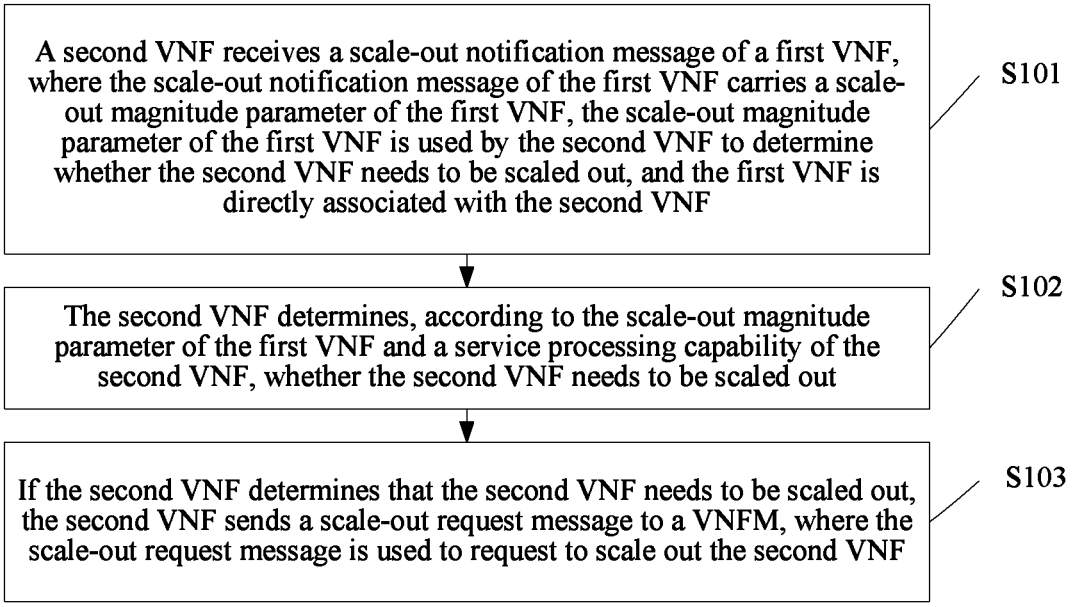
FIG. 2 is a flowchart 1 of a scale-out association method according to an embodiment of the present invention.

This embodiment of the present invention provides a scale-out association method. As shown in FIG. 2, the method may include the following steps.

S101. A second VNF receives a scale-out notification message of a first VNF, where the scale-out notification message of the first VNF carries a scale-out magnitude parameter of the first VNF, the scale-out magnitude parameter of the first VNF is used by the second VNF to determine whether the second VNF needs to be scaled out, and the first VNF is directly associated with the second VNF.

The second VNF may receive the scale-out notification message of the first VNF sent by the first VNF, or may receive the scale-out notification message of the first VNF sent by an NFVO in an NFV system in which the first VNF and the second VNF are located.

It should be noted that, in this embodiment of the present invention, the first VNF is a VNF currently initiating a scale-out operation. After the first VNF initiates the scale-out operation, the first VNF or the NFVO sends the scale-out notification message of the first VNF to the second VNF directly associated with the first VNF. Therefore, the second VNF learns that the first VNF is to be scaled out, and the second VNF determines, according to the scale-out magnitude parameter of the first VNF, whether the second VNF also needs to be scaled out.

The scale-out magnitude parameter of the first VNF is used to indicate an increased service capacity of the first VNF after the first VNF is scaled out. For example, after scale-out, a quantity of users who can be served by the first VNF increases by 100,000, or data traffic that can be output by the first VNF increases by 30%.

Figure 3:
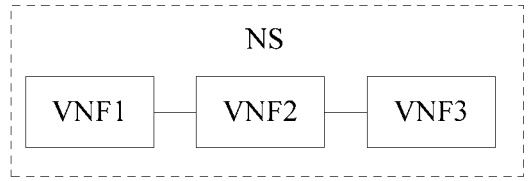
FIG. 3 is a schematic diagram of NS members according to an embodiment of the present invention.

Further, with reference to FIG. 3, a VNF1, a VNF2, and a VNF3 are used as an example to describe an association relationship between VNFs.

For example, it is assumed that the VNF1, the VNF2, and the VNF3 form an NS, that is, the VNF1, the VNF2, and the VNF3 are functionally associated with each other. As shown in FIG. 3, a data flow between the VNF1 and the VNF2 does not pass through another VNF. Therefore, a "direct association" relationship exists between the VNF1 and the VNF2. Likewise, a "direct association" relationship also exists between the VNF2 and the VNF3. A data flow between the VNF1 and the VNF3 needs to pass through the VNF2. Therefore, an "indirect association" relationship exists between the VNF1 and the VNF3.

It should be noted that, in this embodiment of the present invention, a "direct association" relationship exists between the first VNF and the second VNF, that is, the first VNF is directly associated with the second VNF.

S102. The second VNF determines, according to the scale-out magnitude parameter of the first VNF and a service processing capability of the second VNF, whether the second VNF needs to be scaled out.

In this embodiment of the present invention, after the second VNF learns, according to the scale-out notification message of the first VNF, that the first VNF is to be scaled out, the second VNF can determine, according to the scale-out magnitude parameter of the first VNF and the service processing capability of the second VNF, whether the second VNF also needs to be scaled out.

Specifically, the second VNF may determine whether the service processing capability of the second VNF satisfies the scale-out magnitude parameter of the first VNF.

Further, if the service processing capability of the second VNF satisfies the scale-out magnitude parameter of the first VNF, the second VNF determines that the second VNF does not need to be scaled out. If the service processing capability of the second VNF does not satisfy the scale-out magnitude parameter of the first VNF, the second VNF determines that the second VNF needs to be scaled out.

For example, it is assumed that the scale-out magnitude parameter of the first VNF includes 100,000 users, that is, after the first VNF is scaled out, a quantity of users who can be served by the first VNF increases by 100,000. If a current service processing capability of the second VNF is sufficient for processing in time service requests of the to-be-increased 100,000 users, that is, the service processing capability of the second VNF satisfies the scale-out magnitude parameter of the first VNF, the second VNF determines that the second VNF does not need to be scaled out.

If a current service processing capability of the second VNF is not sufficient for processing in time service requests of the to-be-increased 100,000 users, that is, the service processing capability of the second VNF does not satisfy the scale-out magnitude parameter of the first VNF, the second VNF determines that the second VNF needs to be scaled out.

S103. The second VNF sends a scale-out request message to a VNFM if the second VNF determines that the second VNF needs to be scaled out, where the scale-out request message is used to request to scale out the second VNF.

In this embodiment of the present invention, when the second VNF determines that the second VNF needs to be scaled out, the second VNF may send the scale-out request message to the VNFM responsible for managing the second VNF. The scale-out request message further carries a scale-out parameter required by the second VNF. The scale-out parameter is used to indicate a resource that needs to be added to the second VNF (for example, may include a parameter of the resource that needs to be added, such as a quantity of VMs that need to be added and a type of a added VM). Therefore, after receiving the scale-out request message, the VNFM can scale out the second VNF according to the scale-out parameter of the second VNF.

Further, after the VNFM receives the scale-out request message of the second VNF, the VNFM requests, according to information about the resource that needs to be added to the second VNF, the NFVO to reserve a resource, so as to request the NFVO to reserve a resource for the second VNF, and receives, after the NFVO successfully reserves the resource for the second VNF, resource reservation information sent by the NFVO. Further, the VNFM requests a VIM indicated by the resource reservation information to allocate a resource. After the VIM successfully allocates, to the second VNF, the resource indicated by the scale-out parameter of the second VNF, the VNFM returns an acknowledgment message to the second VNF, thereby completing scale-out of the second VNF.

It should be noted that the scale-out parameter of the second VNF is determined by the second VNF according to the scale-out magnitude parameter of the first VNF. That is, when the second VNF determines that the second VNF needs to be scaled out, the second VNF further needs to obtain the scale-out parameter of the second VNF according to the scale-out magnitude parameter of the first VNF. For different VNFs, different services and resources may be measured. Therefore, in this case, the second VNF may obtain, by means of conversion, the scale-out parameter of the second VNF according to the scale-out magnitude parameter of the first VNF. For example, it is assumed that, for the second VNF, one VM needs to be added to the second VNF every time 10,000 users are increased. When the scale-out magnitude parameter of the first VNF includes 100,000 users, the second VNF may determine that 10 VMs need to be added to the second VNF, that is, the scale-out parameter of the second VNF includes 10 VMs.

It may be understood that, in this embodiment of the present invention, when the first VNF is scaled out, the second VNF directly associated with the first VNF can also be scaled out in time, thereby implementing association between scale-out of the first VNF and scale-out of the second VNF. In other words, the scale-out of the second VNF is an associated scale-out performed according to the scale-out of the first VNF.

This embodiment of the present invention provides a scale-out association method. The method may include: receiving, by a second VNF, a scale-out notification message of a first VNF; determining, according to a scale-out magnitude parameter of the first VNF carried in the scale-out notification message of the first VNF and according to a service processing capability of the second VNF, whether the second VNF needs to be scaled out; and sending, by the second VNF, a scale-out request message to a VNFM if the second VNF determines that the second VNF needs to be scaled out, where the scale-out request message is used to request to scale out the second VNF, the scale-out magnitude parameter of the first VNF is used by the second VNF to determine whether the second VNF needs to be scaled out, and the first VNF is directly associated with the second VNF. According to the method, a second VNF can receive in time a scale-out notification message of a first VNF and learn that the first VFN is to be scaled out. When the second VNF determines, according to a scale-out magnitude parameter of the first VNF, that the second VNF also needs to be scaled out, the second VNF can request a VNFM responsible for managing the second VNF to perform scale-out, thereby enhancing a service processing capability of the second VNF in time to ensure that the service processing capability of the second VNF is sufficient for processing in time data traffic that is generated by the first VNF after scale-out, avoiding service impact caused by the scale-out of the first VNF to the second VNF directly associated with the first VNF, and further reducing a service call loss.

Figure 4:
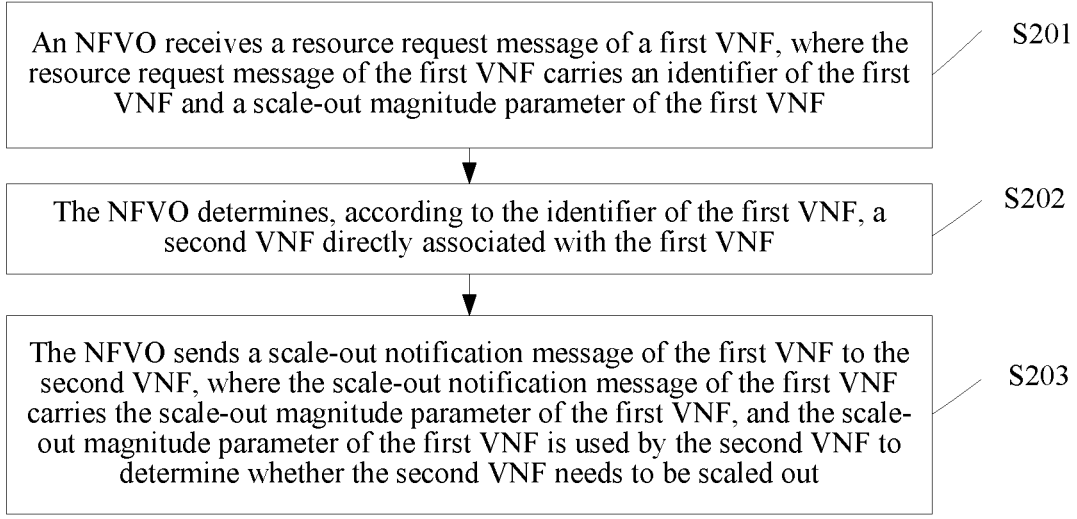
FIG. 4 is a flowchart 2 of a scale-out association method according to an embodiment of the present invention.

This embodiment of the present invention provides a scale-out association method, and specifically describes a procedure in which an NFVO exchanging information with the second VNF in the embodiment shown in FIG. 2 implements the scale-out association method provided in this embodiment of the present invention. As shown in FIG. 4, the method may include the following steps.

S201. The NFVO receives a resource request message of a first VNF, where the resource request message of the first VNF carries an identifier of the first VNF and a scale-out magnitude parameter of the first VNF.

The resource request message of the first VNF may be specifically a resource reservation request message of the first VNF sent by a VNFM responsible for managing the first VNF, a resource scale-out request message of the first VNF sent by an EM or an OSS, or the like.

That a VNFM sends a resource reservation request message to the NFVO is used as an example. When the first VNF initiates a scale-out operation, the first VNF sends a scale-out request message to the VNFM to request the VNFM to scale out the first VNF. In this embodiment of the present invention, the first VNF may add the identifier of the first VNF and the scale-out magnitude parameter of the first VNF to the scale-out request message and send the scale-out request message to the VNFM. Further, when the VNFM sends resource reservation request message to the NFVO to request the NFVO to reserve a resource for the first VNF, the VNFM may add the identifier of the first VNF and the scale-out magnitude parameter of the first VNF to the resource reservation request message and send the resource reservation request message to the NFVO. Then, the NFVO may perform a subsequent scale-out association operation according to the identifier of the first VNF and the scale-out magnitude parameter of the first VNF that are obtained from the resource request message.

A meaning of the scale-out magnitude parameter of the first VNF is the same as that of the scale-out magnitude parameter of the first VNF in the embodiment shown in FIG. 2. For details, refer to related descriptions in the embodiment shown in FIG. 2. Details are not described herein again.

S202. The NFVO determines, according to the identifier of the first VNF, a second VNF directly associated with the first VNF.

Specifically, the NFVO may query, according to the identifier of the first VNF, a preset association list for the second VNF directly associated with the first VNF.

For example, the association list may be specifically a virtualized network function forwarding graph descriptor (VNFFGD) that is set in the NFVO. The NFVO stores and maintains, in the VNFFGD, an association relationship between VNFs, so that the NFVO can directly query, according to the identifier of the first VNF, the VNFFGD for the second VNF directly associated with the first VNF.

S203. The NFVO sends a scale-out notification message of the first VNF to the second VNF, where the scale-out notification message of the first VNF carries the scale-out magnitude parameter of the first VNF, and the scale-out magnitude parameter of the first VNF is used by the second VNF to determine whether the second VNF needs to be scaled out.

Specifically, after the NFVO determines that the second VNF associated with the first VNF exists, the NFVO can add the scale-out magnitude parameter of the first VNF to the scale-out notification message of the first VNF and send the scale-out notification message to the second VNF, so that after receiving the scale-out notification message of the first VNF, the second VNF can determine, according to the scale-out magnitude parameter of the first VNF and a service processing capability of the second VNF, whether the second VNF also needs to be scaled out. In addition, when the second VNF determines that the second VNF also needs to be scaled out, the second VNF sends a scale-out request message to a VNFM responsible for managing the second VNF to request the VNFM responsible for managing the second VNF to scale out the second VNF.

It may be understood that, in this embodiment of the present invention, when the first VNF is scaled out, the second VNF associated with the first VNF can also be scaled out in time, thereby implementing association between scale-out of the first VNF and scale-out of the second VNF.

It should be noted that, in this embodiment of the present invention, the scale-out request message received by the VNFM responsible for managing the first VNF further carries information about a resource requested to be added to the first VNF and is used to request the VNFM to scale out the first VNF. After the VNFM receives the scale-out request message, the VNFM adds, to a resource reservation request message, the identifier of the first VNF, the scale-out magnitude parameter of the first VNF, and the information about the resource requested to be added to the first VNF and sends the resource reservation request message to the NFVO. After the NFVO receives the resource reservation request message, the NFVO can determine the second VNF according to the identifier of the first VNF and send the scale-out notification message of the first VNF to the second VNF. Alternatively, the NFVO may reserve, for the first VNF according to the information that is about the resource requested to be added to the first VNF and that is carried in the resource reservation request message, the resource requested to be added to the first VNF, then determine the second VNF according to the identifier of the first VNF, and send the scale-out notification message of the first VNF to the second VNF. This is not specifically limited in this application.

This embodiment of the present invention provides a scale-out association method. The method may include: receiving, by an NFVO, a resource request message of a first VNF, where the resource request message of the first VNF carries an identifier of the first VNF and a scale-out magnitude parameter of the first VNF; determining, according to the identifier of the first VNF, a second VNF directly associated with the first VNF; and sending a scale-out notification message of the first VNF to the second VNF, where the scale-out notification message carries the scale-out magnitude parameter of the first VNF, and the scale-out magnitude parameter of the first VNF is used by the second VNF to determine whether the second VNF needs to be scaled out. According to the method, an NFVO can send, in time after obtaining a scale-out magnitude parameter of a first VNF, the scale-out magnitude parameter of the first VNF to a second VNF directly associated with the first VNF, so that when determining that a service processing capability of the second VNF is not sufficient for processing in time data traffic that is generated by the first VNF after scale-out, the second VNF can request in time a VNFM responsible for managing the second VNF to perform scale-out, thereby enhancing the service processing capability of the second VNF to ensure that the service processing capability of the second VNF is sufficient for processing in time the data traffic that is generated by the first VNF after the scale-out, avoiding service impact caused by the scale-out of the first VNF to the second VNF directly associated with the first VNF, and further reducing a service call loss.

Figure 5:
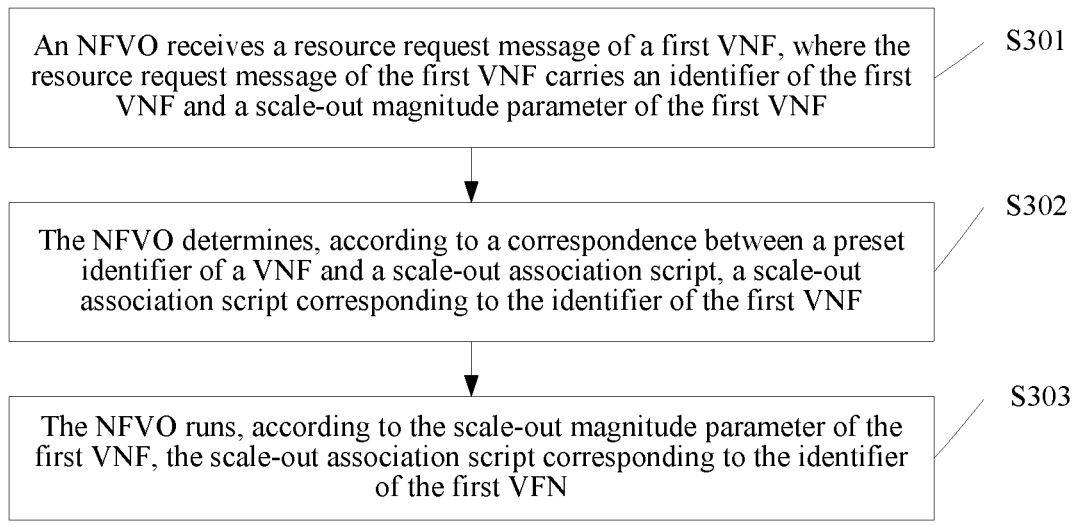
FIG. 5 is a flowchart 3 of a scale-out association method according to an embodiment of the present invention.

Further, different from the scale-out association methods provided in the embodiments shown in FIG. 2 and FIG. 4, another scale-out association method is provided in this embodiment of the present invention, in which an NFVO completes an associated scale-out operation on another VNF directly associated with a first VNF. As shown in FIG. 5, the method may include the following steps.

S301. The NFVO receives a resource request message of the first VNF, where the resource request message of the first VNF carries an identifier of the first VNF and a scale-out magnitude parameter of the first VNF.

The resource request message of the first VNF may be specifically a resource reservation request message of the first VNF sent by a VNFM responsible for managing the first VNF, a resource scale-out request message of the first VNF sent by an EM or an OSS, or the like.

That a VNFM sends a resource reservation request message to the NFVO is used as an example. In this embodiment of the present invention, when the first VNF proactively initiates a scale-out operation, that is, when the first VNF determines, by detecting current load of the first VNF, that the current load of the first VNF exceeds a preset load threshold, the first VNF can initiate the scale-out operation, including sending a scale-out request message to the VNFM to request the VNFM to scale out the first VNF.

In this embodiment of the present invention, the first VNF may add the identifier of the first VNF and the scale-out magnitude parameter of the first VNF to the scale-out request message and send the scale-out request message to the VNFM. Further, when the VNFM sends resource reservation request message to the NFVO to request the NFVO to reserve a resource for the first VNF, the VNFM may add the identifier of the first VNF and the scale-out magnitude parameter of the first VNF to the resource reservation request message and send the resource reservation request message to the NFVO. Then, the NFVO may perform a subsequent scale-out association operation according to the identifier of the first VNF and the scale-out magnitude parameter of the first VNF that are obtained from the resource reservation request message.

A meaning of the scale-out magnitude parameter of the first VNF is the same as that of the scale-out magnitude parameter of the first VNF in the embodiment shown in FIG. 2. For details, refer to related descriptions in the embodiment shown in FIG. 2. Details are not described herein again.

S302. The NFVO determines, according to a preset correspondence between an identifier of a VNF and a scale-out association script, a scale-out association script corresponding to the identifier of the first VNF, where the scale-out association script corresponding to the identifier of the first VFN is used to scale out a VNF that is among VNFs directly associated with the first VNF and that needs to be scaled out.

In this embodiment of the present invention, in the NFVO, a scale-out association script is set for each VNF, and a procedure of scaling out another VNF directly associated with each VNF is set in a scale-out association script of the VNF. When the NFVO scales out a VNF, the NFVO may run a scale-out association script of the VNF, so that the NFVO can determine which VNFs among VNFs directly associated with the first VNF need to be scaled out in an associated manner according to scale-out of the first VNF, determine scale-out magnitudes of the VNFs that need to be scaled out, and scale out the VNFs, thereby implementing scale-out of the VNF that is among the VNFs directly associated with the VNF and that needs to be scaled out.

Further, in this embodiment of the present invention, after the NFVO obtains the identifier of the first VNF, the NFVO may determine, according to the correspondence, in the NFVO, between a preset identifier of a VNF and a scale-out association script, the scale-out association script corresponding to the identifier of the first VNF. The scale-out association script corresponding to the identifier of the first VFN is used to scale out the VNF that is among the VNFs directly associated with the first VNF and that needs to be scaled out.

S303. The NFVO runs, according to the scale-out magnitude parameter of the first VNF, the scale-out association script corresponding to the identifier of the first VFN.

It may be understood that, after the NFVO determines the scale-out association script of the first VNF, the NFVO can input the scale-out magnitude parameter of the first VNF into the scale-out association script and run the scale-out association script, thereby implementing scale-out of the VNF that is among the VNFs directly associated with the first VNF and that needs to be scaled out.

In an NFV system, after the first VNF sends the scale-out request message to the VNFM, the VNFM scales out the first VNF according to information that is about a resource requested to be added to the first VNF and that is carried in the scale-out request message. After the VNFM successfully scales out the first VNF, the VNFM needs to send an acknowledgment message to the first VNF, so that the first VNF determines that the VNFM has completed scale-out of the first VNF. If the first VNF does not receive, within a preset time, an acknowledgment message sent by the VNFM, the first VNF re-sends a scale-out request message to the VNFM, until the first VNF successfully receives an acknowledgment message sent by the VNFM, or the first VNF determines that current scale-out fails.

If the VNFM has sent an acknowledgment message to the first VNF, but the first VNF does not receive the acknowledgment message, after the first VNF re-sends a scale-out request message to the VNFM, the VNFM may understand by mistake that the first VNF re-requests scale-out. In this case, the VNFM re-scales out the first VNF, and the NFVO also scales out, according to the identifier of the first VNF and the scale-out magnitude parameter of the first VNF that are re-sent by the VNFM, the VNF directly associated with the first VNF, causing a waste of resources. Therefore, in this embodiment of the present invention, the scale-out request message sent by the first VNF to the VNFM may further carry a scale-out sequence number identifier of the first VNF, to identify a sequence number of current scale-out of the first VNF. For example, the scale-out sequence number identifier may be specifically a scale-out time sequence of the first VNF. The scale-out time sequence of the first VNF is used to identify a time for scaling out the first VNF. The scale-out sequence number identifier may be identified by using a number or another form.

After the VNFM receives the scale-out request message sent by the first VNF and scales out the first VNF, if the VNFM re-receives a scale-out request message sent by the first VNF, and the VNFM determines that a scale-out time sequence of the first VNF carried in the currently received scale-out request message is the same as a scale-out time sequence of the first VNF carried in the scale-out request message received by the VNFM last time, the VNFM may determine that the scale-out request message currently received by the VNFM is a request message sent by the first VNF for same scale-out. In this case, the VNFM does not need to re-scale out the first VNF, but only needs to re-send an acknowledgment message to the first VNF, thereby preventing the NFVO from re-scaling out the VNF directly associated with the first VNF because the VNFM has re-sent the identifier of the first VNF and the scale-out magnitude parameter of the first VNF to the NFVO by using a resource reservation request message.

Likewise, in this embodiment of the present invention, the NFVO may receive the resource request message of the first VNF for multiple times. For example, after receiving, for multiple times, the scale-out request message sent by the first VNF, the VNFM sends the resource reservation request message to the NFVO for multiple times. Consequently, the NFVO runs, for multiple times according to the identifier of the first VNF and the scale-out magnitude parameter of the first VNF that are carried in the resource reservation request message received for multiple times, the scale-out association script corresponding to the identifier of the first VNF.

Therefore, the resource request message of the first VNF received by the NFVO further carries the scale-out sequence number identifier of the first VNF, so that the NFVO determines, according to the scale-out sequence number identifier of the first VNF and the identifier of the first VNF, whether another resource request message carrying the identifier of the first VNF and the scale-out sequence number identifier of the first VNF has been received.

If the NFVO determines that the another resource request message carrying the identifier of the first VNF and the scale-out sequence number identifier of the first VNF has not been received, the NFVO may perform the step of determining, according to a preset correspondence between an identifier of a VNF and a scale-out association script, a scale-out association script corresponding to the identifier of the first VNF.

If the NFVO determines that the another resource request message carrying the identifier of the first VNF and the scale-out sequence number identifier of the first VNF has been received, the NFVO may not respond to the resource request message or may directly return an acknowledgment message, so as to prevent the NFVO from running, for multiple times, the scale-out association script corresponding to the identifier of the first VNF.

This embodiment of the present invention provides a scale-out association method. The method may include: receiving, by an NFVO, a resource request message of a first VNF, where the resource request message of the first VNF carries an identifier of the first VNF and a scale-out magnitude parameter of the first VNF; determining, according to a preset correspondence between an identifier of a VNF and a scale-out association script, a scale-out association script corresponding to the identifier of the first VNF; and running, according to the scale-out magnitude parameter of the first VNF, the scale-out association script corresponding to the identifier of the first VFN, where the scale-out association script corresponding to the identifier of the first VFN is used to scale out a VNF that is among VNFs directly associated with the first VNF and that needs to be scaled out. According to the method, a scale-out association script is set in an NFVO, so that when the NFVO determines that a first VNF requests scale-out, the NFVO can run a scale-out association script of the first VNF according to a scale-out magnitude parameter of the first VNF, thereby implementing a scale-out operation on a VNF directly associated with the first VNF, enhancing a service processing capability of the VNF directly associated with the first VNF, to ensure that the service processing capability of the VNF directly associated with the first VNF is sufficient for processing in time data traffic that is generated by the first VNF after scale-out, avoiding service impact caused by the scale-out of the first VNF to the VNF directly associated with the first VNF, and further reducing a service call loss.

Embodiment 2

Figure 6A:
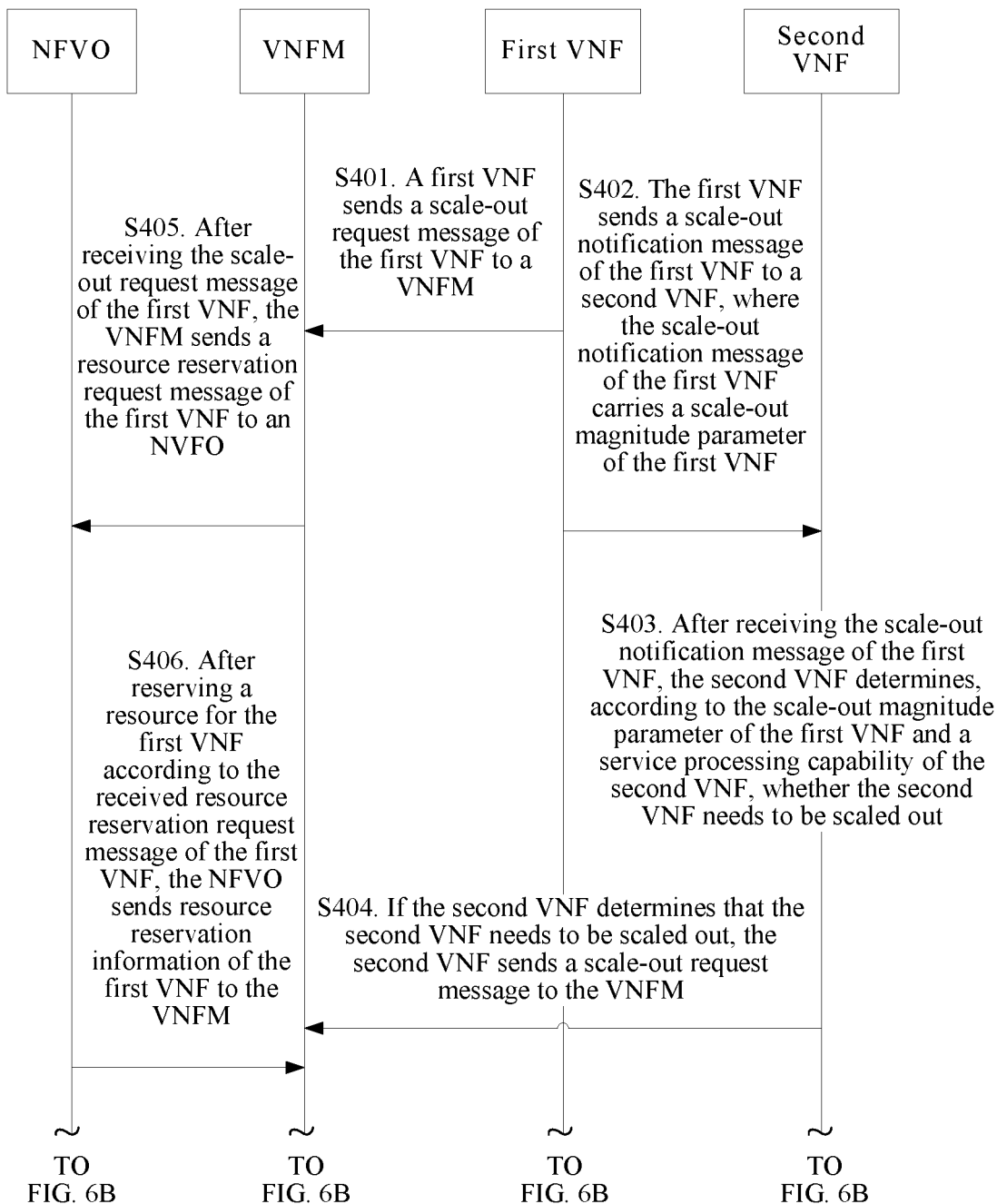
FIG. 6A and FIG. 6B are a interaction diagram 1 of a scale-out association method according to an embodiment of the present invention.
Figure 6B:
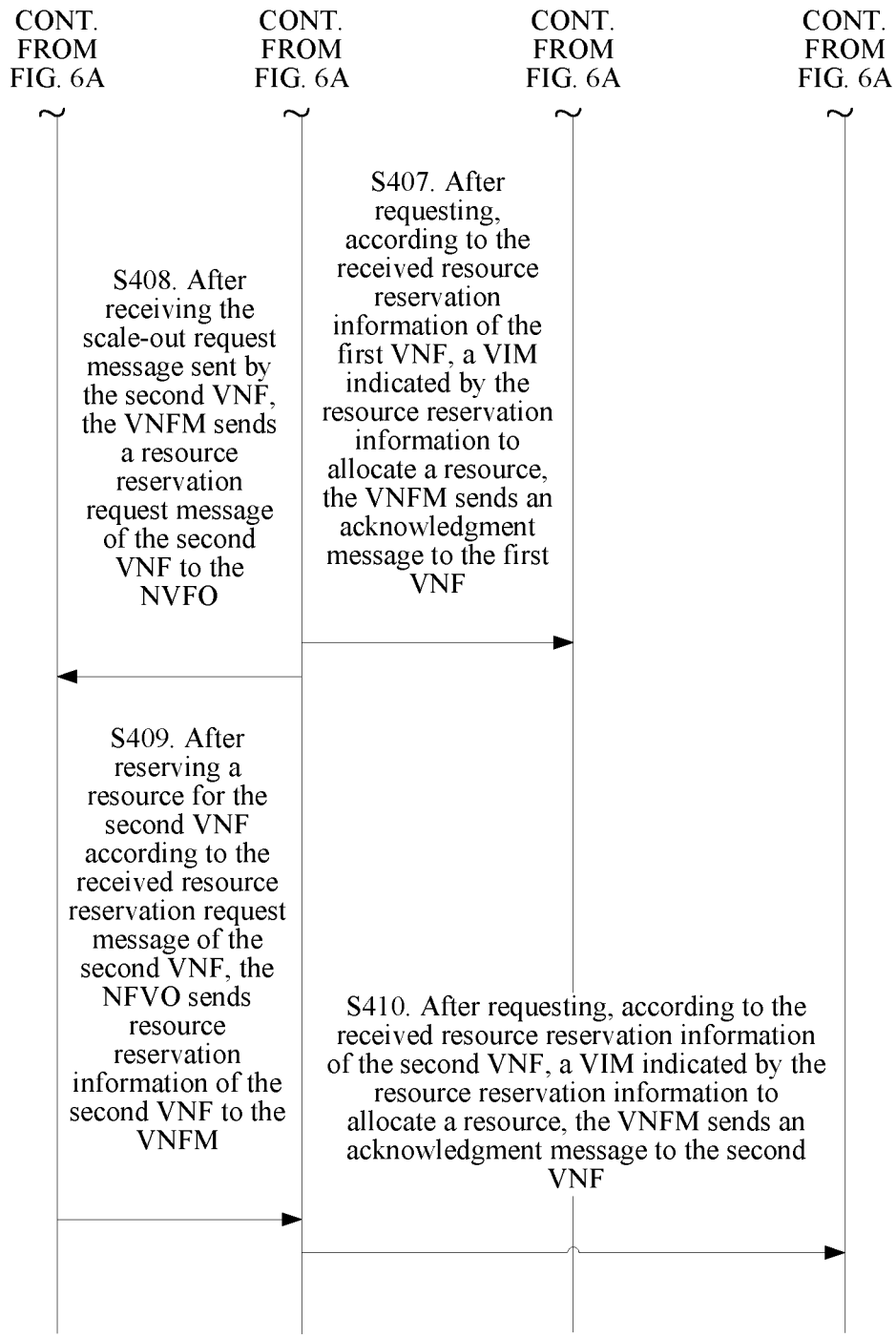

With reference to the embodiment shown in FIG. 2, this embodiment of the present invention provides a scale-out association method. For specific descriptions, refer to the solution in which a second VNF directly receives a scale-out notification message of a first VNF sent by the first VNF in the embodiment shown in FIG. 2. As shown in FIG. 6A and FIG. 6B, the method may include the following steps.

S401. A first VNF sends a scale-out request message of the first VNF to a VNFM.

The first VNF is a VNF currently initiating a scale-out operation.

It should be noted that, in this embodiment of the present invention, if the first VNF initiates a scale-out operation because it is detected that load of the first VNF exceeds a preset load threshold, in an NS to which the first VNF belongs, the first VNF may be referred to as a VNF proactively initiating a scale-out operation.

If the first VNF initiates a scale-out operation because the first VNF receives a scale-out notification message of a VNF directly associated with the first VNF and determines, according to the scale-out notification message, that the first VNF needs to be scaled out, in an NS to which the first VNF belongs, the first VNF may be referred to as a VNF initiating a scale-out operation in an associated manner.

S402. The first VNF sends a scale-out notification message of the first VNF to a second VNF, where the scale-out notification message of the first VNF carries a scale-out magnitude parameter of the first VNF.

In this embodiment of the present invention, when the first VNF sends, to the VNFM, the scale-out request message for scaling out the first VNF, to request the VNFM to scale out the first VNF, the first VNF may simultaneously send the scale-out notification message of the first VNF to the second VNF directly associated with the first VNF, so that the second VNF learns that the first VNF is to be scaled out, and the second VNF determines, according to the scale-out magnitude parameter of the first VNF, whether the second VNF also needs to be scaled out.

Specifically, after the first VNF sends, to the VNFM, the scale-out request message for scaling out the first VNF, the first VNF may first determine the second VNF directly associated with the first VNF.

In this embodiment of the present invention, an association list of the first VNF may be preset in the first VNF. The association list records an identifier of a VNF directly associated with the first VNF, so that the first VNF can determine, by querying the association list, the second VNF directly associated with the first VNF.

Optionally, the first VNF may determine, according to a data flow direction map internally maintained in the first VNF, the second VNF directly associated with the first VNF. Specifically, the data flow direction map is used to record that data sent by which VNFs is received by the first VNF and record VNFs that the first VNF sends data to, that is, VNFs that directly receive data sent by the first VNF. Therefore, the first VNF determines, according to the data flow direction map, a VNF directly receiving data sent by the first VNF as the second VNF.

S403. After receiving the scale-out notification message of the first VNF, the second VNF determines, according to the scale-out magnitude parameter of the first VNF and a service processing capability of the second VNF, whether the second VNF needs to be scaled out.

S404. The second VNF sends a scale-out request message to the VNFM if the second VNF determines that the second VNF needs to be scaled out.

Specifically, a specific implementation of S403 and S404 is the same as an implementation of S102 and S103 in the embodiment shown in FIG. 2, and refer to related descriptions of S102 and S103 in the embodiment shown in FIG. 2. Details are not described herein again.

It should be noted that, in this embodiment of the present invention, to ensure that the second VNF can receive the scale-out notification message of the first VNF, the first VNF may send the scale-out notification message to the second VNF for multiple times after initiating a scale-out operation. If the second VNF receives multiple scale-out notification messages of the first VNF, the second VNF may understand by mistake that the first VNF initiates a scale-out operation for multiple times, and therefore perform an associated scale-out operation for multiple times, causing a waste of resources.

Further, in this embodiment of the present invention, to avoid multiple times of associated scale-out of the second VNF performed because of same scale-out of the first VNF, the scale-out notification message of the first VNF may further carry an identifier of the first VNF and a scale-out sequence number identifier of the first VNF. For example, the scale-out sequence number identifier may be specifically a scale-out time sequence of the first VNF. The scale-out time sequence of the first VNF is used to identify a time for scaling out the first VNF.

Further, before the second VNF determines whether associated scale-out of the second VNF needs to be performed according to scale-out of the first VNF, the second VNF may first determine whether another scale-out notification message carrying the identifier of the first VNF and the scale-out sequence number identifier of the first VNF has been received.

If the second VNF determines that the another scale-out notification message carrying the identifier of the first VNF and the scale-out sequence number identifier of the first VNF has been received, the second VNF may not need to perform the step of determining, according to the scale-out magnitude parameter of the first VNF and a service processing capability of the second VNF, whether the second VNF needs to be scaled out.

If the second VNF determines that the another scale-out notification message carrying the identifier of the first VNF and the scale-out sequence number identifier of the first VNF has not been received, the second VNF may perform the step of determining, according to the scale-out magnitude parameter of the first VNF and a service processing capability of the second VNF, whether the second VNF needs to be scaled out.

It should be noted that, in this embodiment of the present invention, the scale-out notification message of the first VNF may further carry an identifier of a VNF proactively initiating a scale-out operation and a scale-out sequence number identifier of the VNF proactively initiating the scale-out operation, for the second VNF to track the service currently scaled-out.

For example, if the first VNF is a VNF proactively initiating a scale-out operation, a scale-out notification message of the first VNF may further carry the identifier of the first VNF and the scale-out sequence number identifier of the first VNF. If the first VNF is a VNF initiating a scale-out operation in an associated manner, assuming that a third VNF is a VNF that belongs to the NS to which the first VNF belongs and that proactively initiates a scale-out operation, the scale-out notification message of the first VNF may further carry an identifier of the third VNF and a scale-out sequence number identifier of the third VNF. The scale-out sequence number identifier of the third VNF may specifically include a scale-out time sequence of the third VNF. The scale-out time sequence of the third VNF is used to represent a time point of current scale-out of the third VNF.

S405. After receiving the scale-out request message of the first VNF, the VNFM sends a resource reservation request message of the first VNF to an NFVO.

S406. After reserving a resource for the first VNF according to the received resource reservation request message of the first VNF, the NFVO sends resource reservation information of the first VNF to the VNFM.

S407. After requesting, according to the received resource reservation information of the first VNF, a VIM indicated by the resource reservation information to allocate a resource, the VNFM sends an acknowledgment message to the first VNF.

S408. After receiving the scale-out request message sent by the second VNF, the VNFM sends a resource reservation request message of the second VNF to the NFVO.

S409. After reserving a resource for the second VNF according to the received resource reservation request message of the second VNF, the NFVO sends resource reservation information of the second VNF to the VNFM.

S410. After requesting, according to the received resource reservation information of the second VNF, a VIM indicated by the resource reservation information to allocate a resource, the VNFM sends an acknowledgment message to the second VNF.

It should be noted that S405 to S407 may be performed after S401. This is not limited in this application.

Figure 7A:
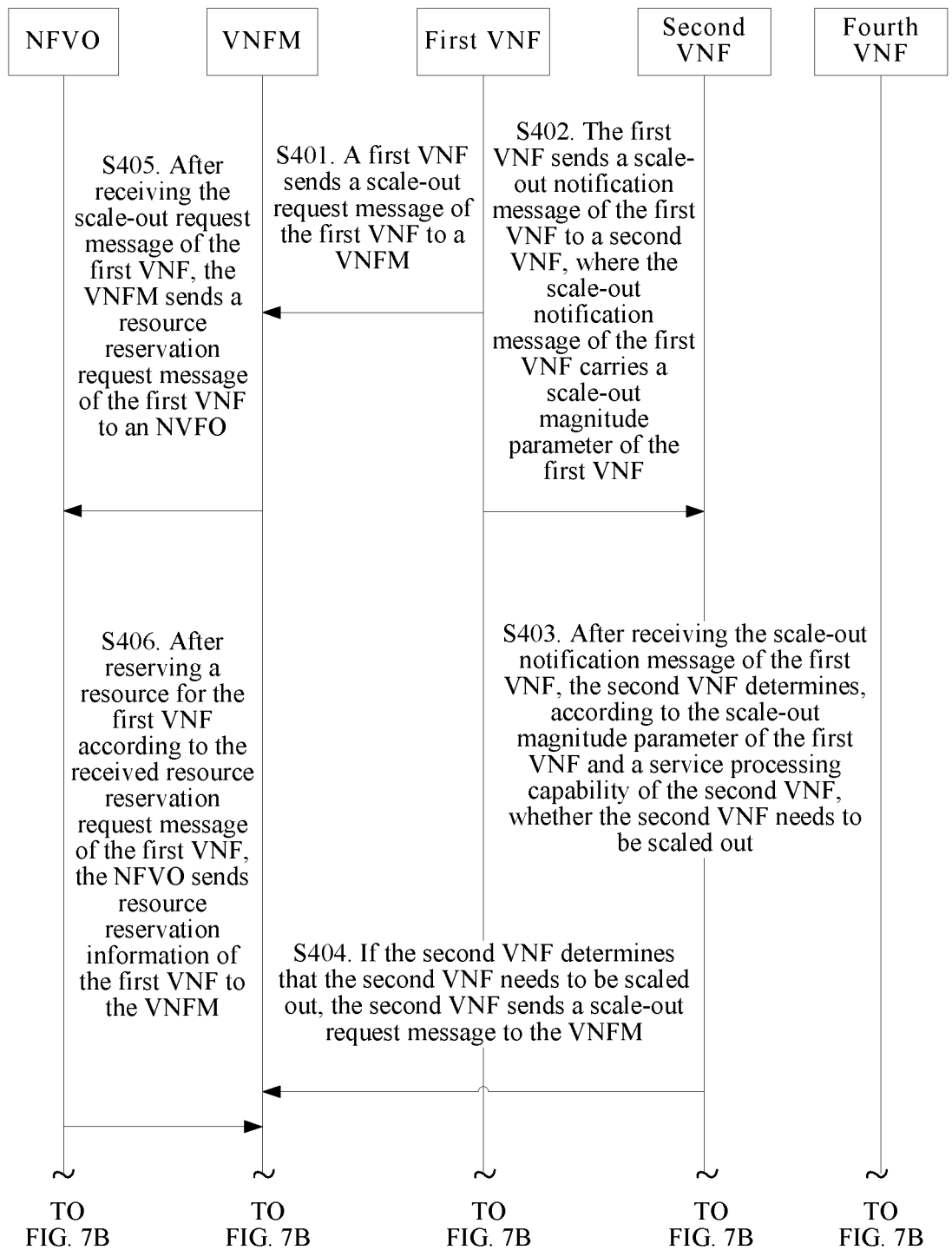
FIG. 7A and FIG. 7B are a interaction diagram 2 of a scale-out association method according to an embodiment of the present invention.
Figure 7B:
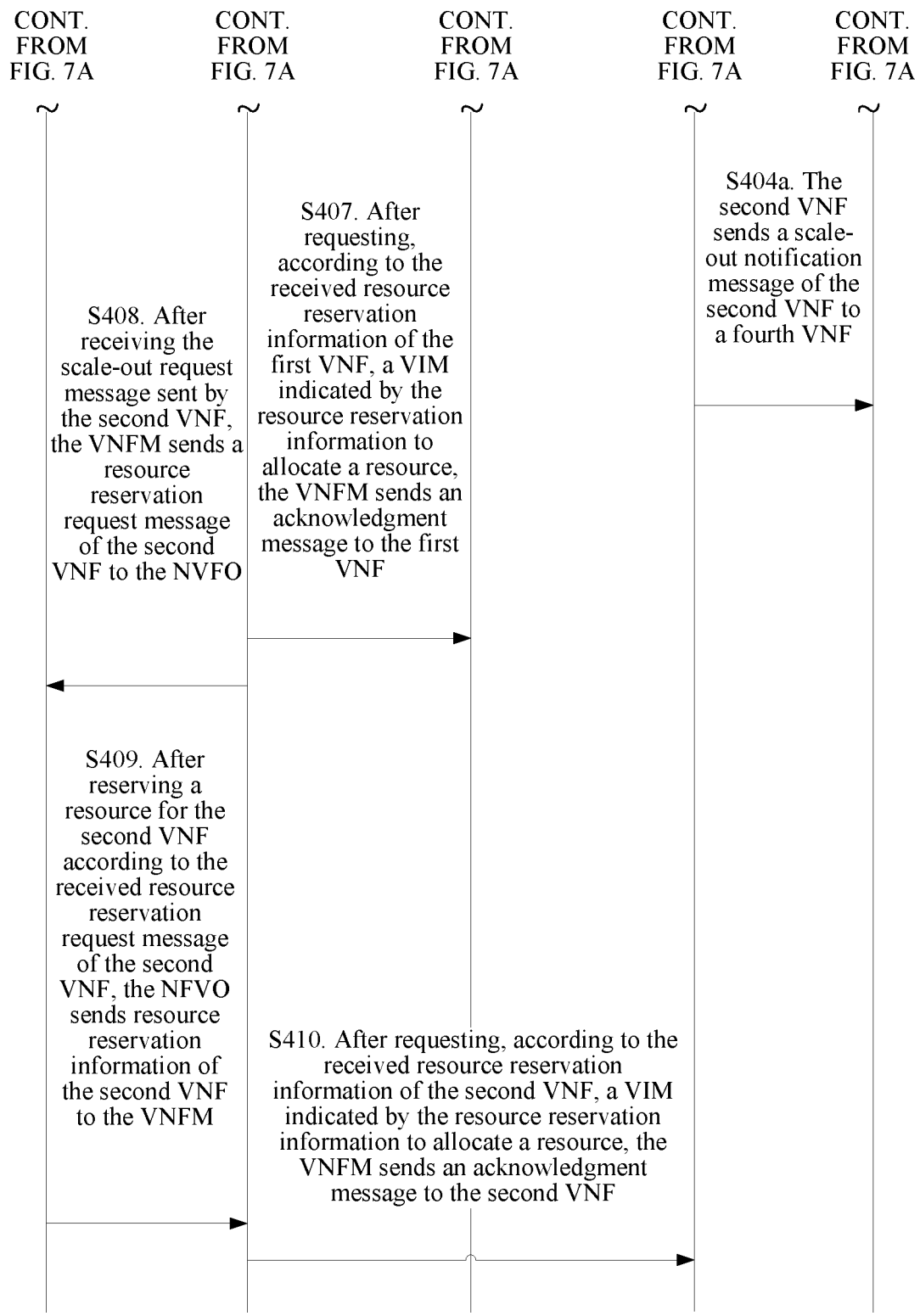

Further, with reference to FIG. 6A and FIG. 6B, as shown in FIG. 7A and FIG. 7B, if the second VNF is further directly associated with a fourth VNF, after S404, the method further includes the following step:

S404a. The second VNF sends a scale-out notification message of the second VNF to the fourth VNF.

Specifically, in this embodiment of the present invention, after the second VNF determines, according to the scale-out magnitude parameter of the first VNF, that the second VNF needs to be scaled out, and sends the scale-out request message of the second VNF to the VNFM, the second VNF may further determine whether a VNF directly associated with the second VNF exists. If the second VNF determines that a VNF, for example, the fourth VNF, directly associated with the second VNF exists, the second VNF may send the scale-out notification message of the second VNF to the fourth VNF.

The scale-out notification message of the second VNF carries a scale-out magnitude parameter of the second VNF. The scale-out magnitude parameter of the second VNF is determined by the second VNF according to the scale-out magnitude parameter of the first VNF. Specifically, the second VNF may determine, according to the scale-out magnitude parameter of the first VNF, a resource that needs to be added to the second VNF. Then, the second VNF may determine an increased service capacity after the second VNF is scaled out, and further determine the scale-out magnitude parameter of the second VNF. The scale-out magnitude parameter of the second VNF is used by the fourth VNF to determine whether the fourth VNF needs to be scaled out.

Optionally, in this embodiment of the present invention, the scale-out notification message of the second VNF may further carry an identifier of a VNF proactively initiating a scale-out operation and a scale-out sequence number identifier of the VNF proactively initiating the scale-out operation, for the fourth VNF to track the service currently scaled-out.

It should be noted that after receiving the scale-out notification message of the second VNF, the fourth VNF determines, according to the scale-out magnitude parameter of the second VNF and a service processing capability of the fourth VNF, that the fourth VNF may require an associated scale-out operation. To avoid multiple times of scale-out of the fourth VNF performed because the second VNF sends the scale-out notification message of the second VNF to the fourth VNF for multiple times, the second VNF needs to add a scale-out sequence number identifier of the second VNF to the scale-out notification message of the second VNF, so that the fourth VNF determines, according to an identifier of the second VNF and the scale-out sequence number identifier of the second VNF, whether another scale-out notification message carrying the identifier of the second VNF and the scale-out sequence number identifier of the second VNF has been received, and may not need to perform an associated scale-out operation again if the another scale-out notification message has been received.

This embodiment of the present invention provides a scale-out association method. The method may include: receiving, by a second VNF, a scale-out notification message of a first VNF; determining, according to a scale-out magnitude parameter of the first VNF carried in the scale-out notification message of the first VNF and according to a service processing capability of the second VNF, whether the second VNF needs to be scaled out; and sending, by the second VNF, a scale-out request message if the second VNF determines that the second VNF needs to be scaled out, where the scale-out request message is used to request to scale out the second VNF, the scale-out magnitude parameter of the first VNF is used by the second VNF to determine whether the second VNF needs to be scaled out, and the first VNF is directly associated with the second VNF. According to the method, a second VNF can receive in time a scale-out notification message of a first VNF and learn that the first VFN is to be scaled out. When the second VNF determines, according to a scale-out magnitude parameter of the first VNF, that the second VNF also needs to be scaled out, the second VNF can request a VNFM responsible for managing the second VNF to perform scale-out, thereby enhancing a service processing capability of the second VNF in time to ensure that the service processing capability of the second VNF is sufficient for processing in time data traffic that is generated by the first VNF after scale-out, avoiding service impact caused by the scale-out of the first VNF to the second VNF directly associated with the first VNF, and further reducing a service call loss.

Figure 8A:
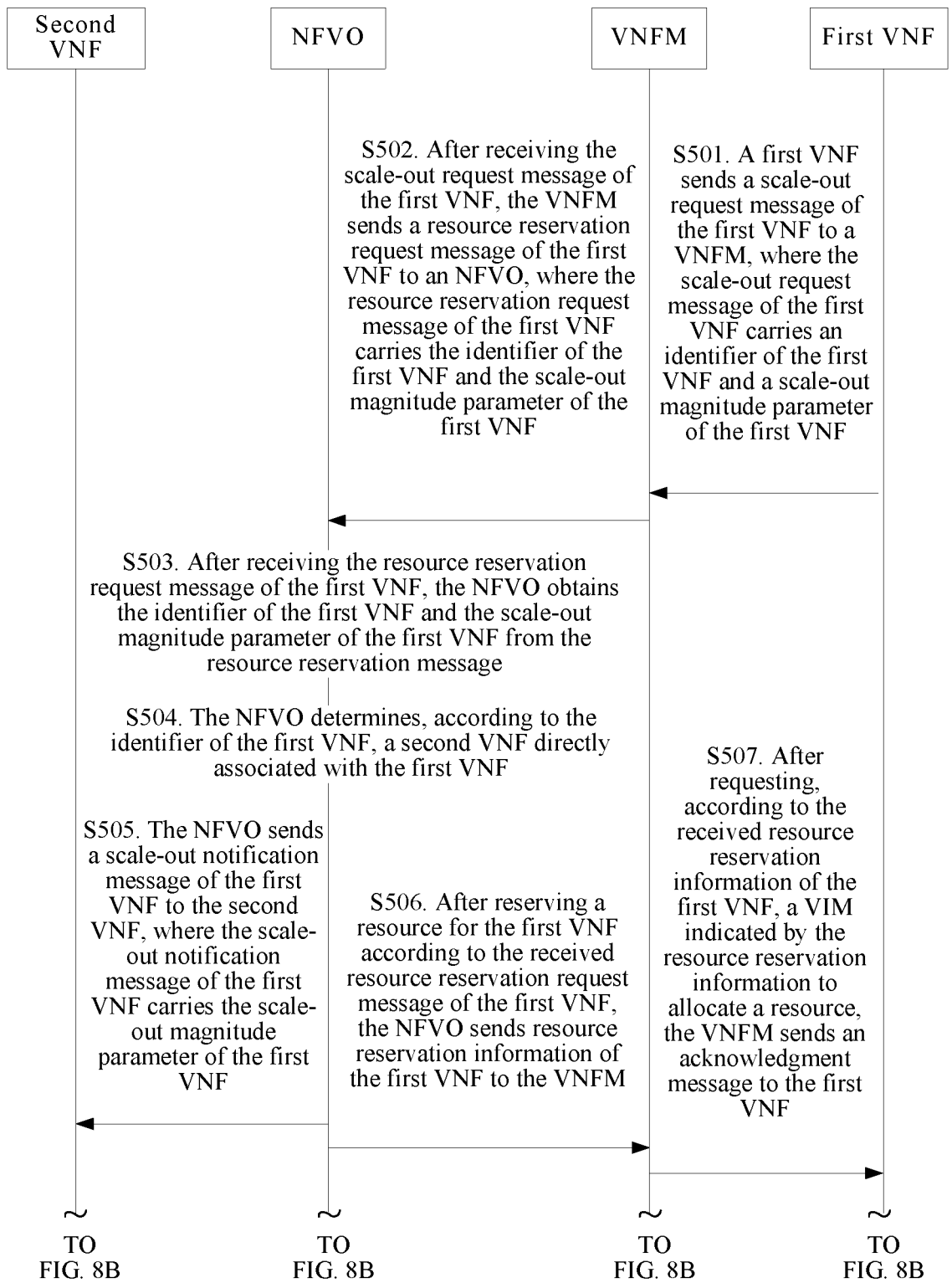
FIG. 8A and FIG. 8B are a interaction diagram 3 of a scale-out association method according to an embodiment of the present invention.
Figure 8B:
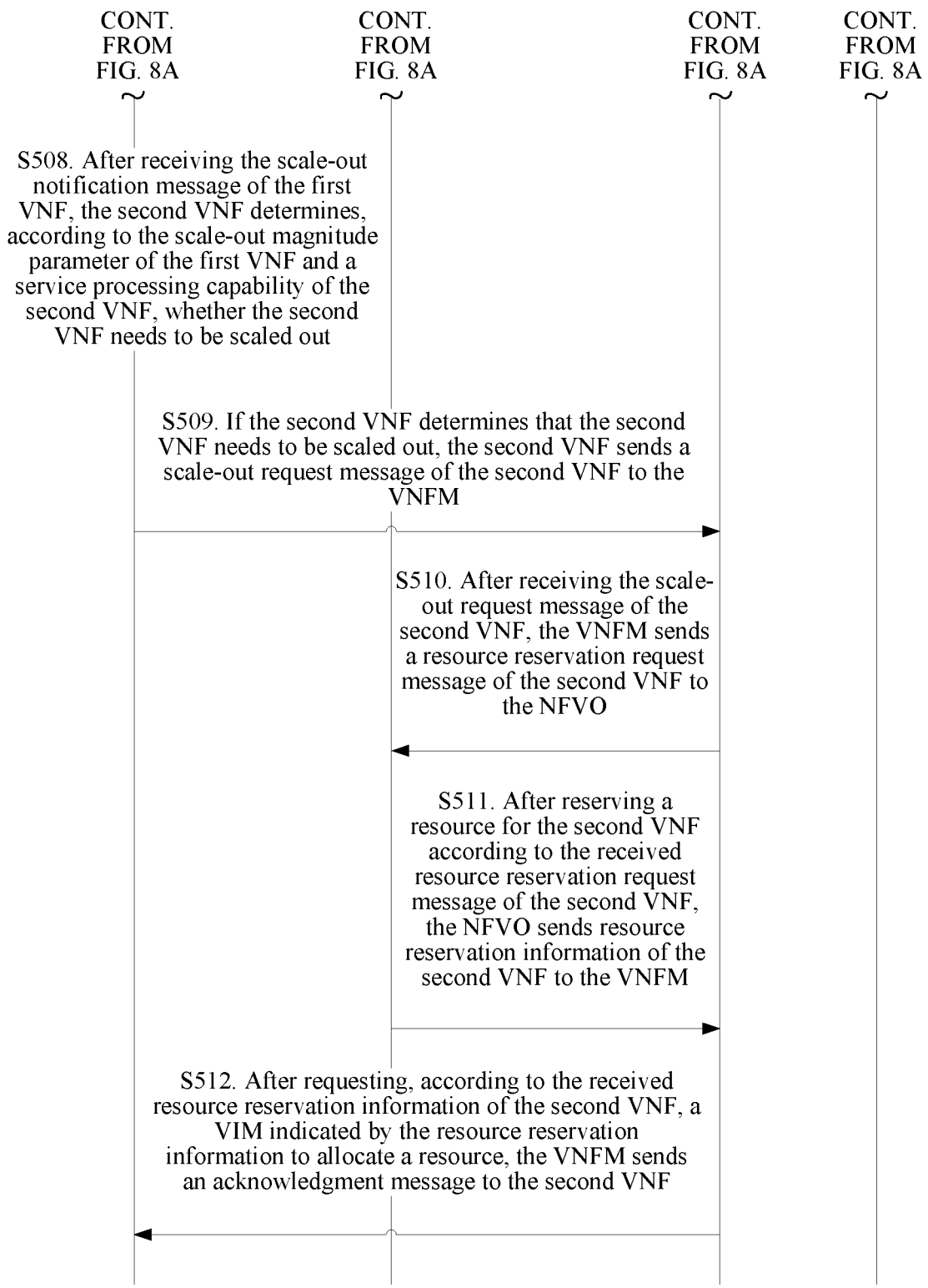

With reference to the embodiments shown in FIG. 2 and FIG. 4, this embodiment of the present invention provides a scale-out association method. For specific descriptions, refer to the solution in which a second VNF receives a scale-out notification message of a first VNF sent by an NFVO in the embodiment shown in FIG. 2. As shown in FIG. 8A and FIG. 8B, the method may include the following steps.

S501. A first VNF sends a scale-out request message of the first VNF to a VNFM, where the scale-out request message of the first VNF carries an identifier of the first VNF and a scale-out magnitude parameter of the first VNF.

The first VNF is a VNF currently initiating a scale-out operation. That is, the first VNF may be a VNF proactively initiating a scale-out operation, or the first VNF may be a VNF initiating a scale-out operation in an associated manner.

In this embodiment of the present invention, when the first VNF currently initiating the scale-out operation sends the scale-out request message of the first VNF to the VNFM responsible for managing the first VNF, the first VNF may add the identifier of the first VNF and the scale-out magnitude parameter of the first VNF to the scale-out request message, so that after the VNFM sends the identifier of the first VNF and the scale-out magnitude parameter of the first VNF to an NFVO by using a resource reservation request message, the NFVO may perform a subsequent scale-out association operation according to the identifier of the first VNF and the scale-out magnitude parameter of the first VNF.

S502. After receiving the scale-out request message of the first VNF, the VNFM sends a resource reservation request message of the first VNF to an NFVO, where the resource reservation request message of the first VNF carries the identifier of the first VNF and the scale-out magnitude parameter of the first VNF.

Specifically, after the VNFM receives the scale-out request message of the first VNF, the VNFM sends the resource reservation request message of the first VNF to the NFVO according to the scale-out request message of the first VNF, to request the NFVO to reserve, for the first VNF, a resource requested to be added to the first VNF.

In this embodiment of the present invention, the VNFM may add both the identifier of the first VNF and the scale-out magnitude parameter of the first VNF to the resource reservation request message of the first VNF, so that the NFVO may perform a subsequent scale-out association operation according to the identifier of the first VNF and the scale-out magnitude parameter of the first VNF.

S503. After receiving the resource reservation request message of the first VNF, the NFVO obtains the identifier of the first VNF and the scale-out magnitude parameter of the first VNF from the resource reservation request message.

In this embodiment of the present invention, a resource request message of the first VNF received by the NFVO is the resource reservation request message of the first VNF sent by the VNFM.

S504. The NFVO determines, according to the identifier of the first VNF, a second VNF directly associated with the first VNF.

S505. The NFVO sends a scale-out notification message of the first VNF to the second VNF, where the scale-out notification message of the first VNF carries the scale-out magnitude parameter of the first VNF.

Specifically, an implementation of S504 and S505 is the same as an implementation of S202 and S203 in the embodiment shown in FIG. 4, and refer to related descriptions of S202 and S203 in the embodiment shown in FIG. 4. Details are not described herein again.

S506. After reserving a resource for the first VNF according to the received resource reservation request message of the first VNF, the NFVO sends resource reservation information of the first VNF to the VNFM.

S507. After requesting, according to the received resource reservation information of the first VNF, a VIM indicated by the resource reservation information to allocate a resource, the VNFM sends an acknowledgment message to the first VNF.

S508. After receiving the scale-out notification message of the first VNF, the second VNF determines, according to the scale-out magnitude parameter of the first VNF and a service processing capability of the second VNF, whether the second VNF needs to be scaled out.

S509. The second VNF sends a scale-out request message of the second VNF to the VNFM if the second VNF determines that the second VNF needs to be scaled out.

Specifically, an implementation of S508 and S509 is the same as an implementation of S102 and S103 in the embodiment shown in FIG. 2, and refer to related descriptions of S102 and S103 in the embodiment shown in FIG. 2. Details are not described herein again.

It should be noted that, in this embodiment of the present invention, to ensure that the second VNF can receive the scale-out notification message of the first VNF, the NFVO may send the scale-out notification message to the second VNF for multiple times. If the second VNF receives multiple scale-out notification messages of the first VNF, the second VNF may understand by mistake that the first VNF initiates a scale-out operation for multiple times, and therefore perform an associated scale-out operation for multiple times, causing a waste of resources.

Further, in this embodiment of the present invention, to avoid multiple times of associated scale-out of the second VNF performed because of same scale-out of the first VNF, the scale-out notification message of the first VNF may further carry a scale-out sequence number identifier of the first VNF.

Specifically, in S501, when the first VNF sends the scale-out request message of the first VNF to the VNFM, the first VNF further adds the scale-out sequence number identifier of the first VNF to the scale-out request message of the first VNF, so that the VNFM may send a scale-out time sequence of the first VNF to the NFVO by using the resource reservation request message of the first VNF, and the NFVO may add both the identifier of the first VNF and the scale-out sequence number identifier of the first VNF to the scale-out notification message of the first VNF and send the scale-out notification message to the second VNF.

Further, after the second VNF receives the scale-out notification message of the first VNF, before the second VNF determines whether associated scale-out needs to be performed on the second VNF according to scale-out of the first VNF, the second VNF may first determine whether another scale-out notification message carrying the identifier of the first VNF and the scale-out sequence number identifier of the first VNF has been received.

If the second VNF determines that the another scale-out notification message carrying the identifier of the first VNF and the scale-out sequence number identifier of the first VNF has been received, the second VNF may not need to perform the step of determining, according to the scale-out magnitude parameter of the first VNF and a service processing capability of the second VNF, whether the second VNF needs to be scaled out.

If the second VNF determines that the another scale-out notification message carrying the identifier of the first VNF and the scale-out sequence number identifier of the first VNF has not been received, the second VNF may perform the step of determining, according to the scale-out magnitude parameter of the first VNF and a service processing capability of the second VNF, whether the second VNF needs to be scaled out.

Further, after the second VNF determines that the second VNF needs to be scaled out, the second VNF may send a scale-out request message of the second VNF to a VNFM responsible for managing the second VNF, to request the VNFM to scale out the second VNF.

It should be noted that, in this embodiment of the present invention, the scale-out request message of the second VNF carries an identifier of the second VNF and a scale-out magnitude parameter of the second VNF, so that in a process in which the VNFM scales out the second VNF, after the identifier of the second VNF and the scale-out magnitude parameter of the second VNF are sent to the NFVO by using resource reservation information of the second VNF, the NFVO may perform a subsequent scale-out association operation according to the identifier of the second VNF and the scale-out magnitude parameter of the second VNF. For example, the NFVO determines, according to the identifier of the second VNF, a fourth VNF directly associated with the second VNF, and sends a scale-out notification message of the second VNF to the fourth VNF.

It should be noted that, in this embodiment of the present invention, the scale-out notification message of the first VNF may further carry an identifier of a VNF proactively initiating a scale-out operation and a scale-out sequence number identifier of the VNF proactively initiating the scale-out operation, for the second VNF to track the service currently scaled-out.

For example, if the first VNF is a VNF proactively initiating a scale-out operation, the scale-out notification message of the first VNF may further carry the identifier of the first VNF and the scale-out sequence number identifier of the first VNF. If the first VNF is a VNF initiating a scale-out operation in an associated manner, assuming that a third VNF is a VNF that belongs to an NS to which the first VNF belongs and that proactively initiates a scale-out operation, the scale-out notification message of the first VNF may further carry an identifier of the third VNF and a scale-out sequence number identifier of the third VNF.

Likewise, the scale-out notification message of the second VNF sent to the fourth VNF may also carry an identifier of a VNF proactively initiating a scale-out operation and a scale-out sequence number identifier of the VNF proactively initiating the scale-out operation, for the fourth VNF to track the service currently scaled-out.

S510. After receiving the scale-out request message of the second VNF, the VNFM sends a resource reservation request message of the second VNF to the NFVO.

S511. After reserving a resource for the second VNF according to the received resource reservation request message of the second VNF, the NFVO sends resource reservation information of the second VNF to the VNFM.

S512. After requesting, according to the received resource reservation information of the second VNF, a VIM indicated by the resource reservation information to allocate a resource, the VNFM sends an acknowledgment message to the second VNF.

It should be noted that S506 and S507 may be performed after S505, including being performed after S505 and before S508, may be performed after S508 and before S512, or may be performed after S512. This is not limited in this application.

This embodiment of the present invention provides a scale-out association method. The method may include: receiving, by an NFVO, a resource request message of a first VNF, where the resource request message carries an identifier of the first VNF and a scale-out magnitude parameter of the first VNF; determining, according to the identifier of the first VNF, a second VNF directly associated with the first VNF; and sending a scale-out notification message of the first VNF to the second VNF, where the scale-out notification message carries the scale-out magnitude parameter of the first VNF, and the scale-out magnitude parameter of the first VNF is used by the second VNF to determine whether the second VNF needs to be scaled out. According to the method, an NFVO can send, in time after obtaining a scale-out magnitude parameter of a first VNF, the scale-out magnitude parameter of the first VNF to a second VNF directly associated with the first VNF, so that when determining that a service processing capability of the second VNF is not sufficient for processing in time data traffic that is generated by the first VNF after scale-out, the second VNF can request in time a VNFM responsible for managing the second VNF to perform scale-out, thereby enhancing the service processing capability of the second VNF to ensure that the service processing capability of the second VNF is sufficient for processing in time the data traffic that is generated by the first VNF after the scale-out, avoiding service impact caused by the scale-out of the first VNF to the second VNF directly associated with the first VNF, and further reducing a service call loss.

Embodiment 3

Figure 9:
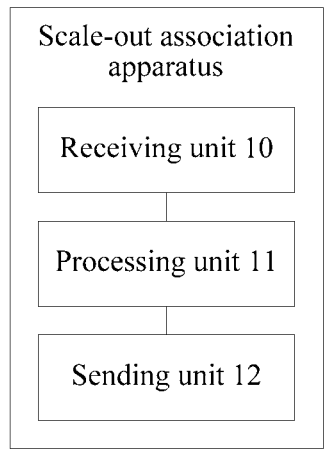
FIG. 9 is a schematic structural diagram of a scale-out association apparatus according to an embodiment of the present invention.

As shown in FIG. 9, this embodiment of the present invention provides a scale-out association apparatus. The scale-out association apparatus may be a physical apparatus of the second VNF described in the embodiment shown in any accompanying drawing of FIG. 2, FIG. 4, or FIG. 6A and FIG. 6B to FIG. 8A and FIG. 8B, or a physical apparatus in which a logical function module is located, where the logical function module is in an NFV system and can perform a method procedure that can be performed by the second VNF. The physical apparatus may be independently installed in the physical apparatus of the second VNF, or may be a physical apparatus that can communicate with the physical apparatus of the second VNF. The apparatus may also be presented in a form of a chip. The chip carries an application program that can implement the method procedure that can be performed by the second VNF.

The apparatus may include:

a receiving unit 10, configured to receive a scale-out notification message of a first virtualized network function VNF, where the scale-out notification message of the first VNF carries a scale-out magnitude parameter of the first VNF, the scale-out magnitude parameter of the first VNF is used by a processing unit 11 to determine whether a second VNF needs to be scaled out, and the first VNF is directly associated with the second VNF;

the processing unit 11, configured to determine, according to the scale-out magnitude parameter of the first VNF received by the receiving unit 10 and a service processing capability of the second VNF, whether the second VNF needs to be scaled out; and a sending unit 12, configured to send a scale-out request message to a VNFM if the processing unit 11 determines that the second VNF needs to be scaled out, where the scale-out request message is used to request to scale out the second VNF.

Optionally, the scale-out magnitude parameter of the first VNF received by the receiving unit 10 is used to indicate an increased service capacity of the first VNF after the first VNF is scaled out.

Optionally, the processing unit 11 is further configured to obtain a scale-out parameter of the second VNF according to the scale-out magnitude parameter of the first VNF if the processing unit 11 determines that the second VNF needs to be scaled out, where the scale-out parameter indicates a resource that needs to be added to the second VNF.

The scale-out request message sent by the sending unit 12 carries the scale-out parameter of the second VNF.

Optionally, the processing unit 11 is specifically configured to: determine whether the service processing capability of the second VNF satisfies the scale-out magnitude parameter of the first VNF; and if the service processing capability of the second VNF satisfies the scale-out magnitude parameter of the first VNF, determine that the second VNF does not need to be scaled out; or if the service processing capability of the second VNF does not satisfy the scale-out magnitude parameter of the first VNF, determine that the second VNF needs to be scaled out.

Optionally, the receiving unit 10 is specifically configured to receive the scale-out notification message of the first VNF sent by a network functions virtualization orchestrator NFVO.

Optionally, the scale-out request message sent by the sending unit 12 carries a scale-out magnitude parameter of the second VNF. The scale-out magnitude parameter of the second VNF is determined by the processing unit 11 according to the scale-out magnitude parameter of the first VNF. The scale-out magnitude parameter of the second VNF is used to indicate an increased service capacity of the second VNF after the second VNF is scaled out.

Optionally, the receiving unit 10 is specifically configured to receive the scale-out notification message of the first VNF sent by the first VNF.

Optionally, the sending unit 12 is further configured to: after the sending unit 12 sends the scale-out request message, send a scale-out notification message of the second VNF to a fourth VNF directly associated with the second VNF. The scale-out notification message of the second VNF carries the scale-out magnitude parameter of the second VNF. The scale-out magnitude parameter of the second VNF is determined by the processing unit according to the scale-out magnitude parameter of the first VNF. The scale-out magnitude parameter of the second VNF is used by the fourth VNF to determine whether the fourth VNF needs to be scaled out.

Optionally, the processing unit 11 is further configured to: determine whether another scale-out notification message carrying an identifier of the first VNF and a scale-out sequence number identifier of the first VNF has been received; and if the another scale-out notification message has not been received, perform the step of determining, according to the scale-out magnitude parameter of the first VNF and a service processing capability of the second VNF, whether the second VNF needs to be scaled out.

Optionally, the scale-out request message sent by the sending unit 12 to the VNFM or the scale-out notification message of the second VNF sent by the sending unit to the fourth VNF further carries an identifier of the second VNF and a scale-out sequence number identifier of the second VNF.

This embodiment of the present invention provides a scale-out association apparatus. The scale-out association apparatus can receive a scale-out notification message of a first VNF, determine, according to a scale-out magnitude parameter of the first VNF carried in the scale-out notification message of the first VNF and according to a service processing capability of a second VNF, whether the second VNF needs to be scaled out, and send a scale-out request message to a VNFM if the apparatus determines that the second VNF needs to be scaled out, where the scale-out request message is used to request to scale out the second VNF, the scale-out magnitude parameter of the first VNF is used to determine whether the second VNF needs to be scaled out, and the first VNF is directly associated with the second VNF. The scale-out association apparatus can receive in time a scale-out notification message of a first VNF and learn that the first VFN is to be scaled out. When determining, according to a scale-out magnitude parameter of the first VNF, that a second VNF also needs to be scaled out, the scale-out association apparatus can request a VNFM responsible for managing the second VNF to perform scale-out, thereby enhancing a service processing capability of the second VNF in time to ensure that the service processing capability of the second VNF is sufficient for processing in time data traffic that is generated by the first VNF after scale-out, avoiding service impact caused by the scale-out of the first VNF to the second VNF directly associated with the first VNF, and further reducing a service call loss.

Figure 10:
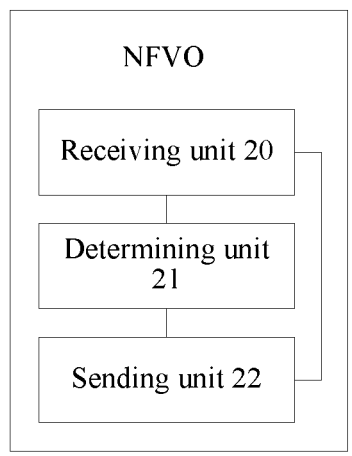
FIG. 10 is a schematic structural diagram of an NFVO according to an embodiment of the present invention.

As shown in FIG. 10, this embodiment of the present invention provides an NFVO. The NFVO may be a physical apparatus of the NFVO described in the embodiment shown in any accompanying drawing of FIG. 4 or FIG. 6A and FIG. 6B to FIG. 8A and FIG. 8B, or a physical apparatus in which a logical function module is located, where the logical function module is in an NFV system and can perform a method procedure that can be performed by the NFVO. The NFVO may also be presented in a form of a chip. The chip carries an application program that can implement the method procedure that can be performed by the second VNF.

The apparatus may include:

a receiving unit 20, configured to receive a resource request message of a first VNF, where the resource request message of the first VNF carries an identifier of the first VNF and a scale-out magnitude parameter of the first VNF;

a determining unit 21, configured to determine, according to the identifier of the first VNF received by the receiving unit 20, a second VNF directly associated with the first VNF; and a sending unit 22, configured to send a scale-out notification message of the first VNF to the second VNF, where the scale-out notification message of the first VNF carries the scale-out magnitude parameter of the first VNF received by the receiving unit 20, and the scale-out magnitude parameter of the first VNF is used by the second VNF to determine whether the second VNF needs to be scaled out.

Optionally, the determining unit 21 is specifically configured to query, according to the identifier of the first VNF, a preset association list for the second VNF directly associated with the first VNF.

Optionally, the resource request message of the first VNF received by the receiving unit 20 further carries a scale-out sequence number identifier of the first VNF.

Optionally, the scale-out notification message of the first VNF sent by the sending unit 22 further carries the scale-out sequence number identifier of the first VNF, and the scale-out sequence number identifier of the first VNF is used by the second VNF to determine whether another scale-out notification message carrying the scale-out sequence number identifier of the first VNF has been received.

This embodiment of the present invention provides an NFVO. The NFVO can receive a resource request message of a first VNF, where the resource request message of the first VNF carries an identifier of the first VNF and a scale-out magnitude parameter of the first VNF, determine, according to the identifier of the first VNF, a second VNF directly associated with the first VNF, and send a scale-out notification message of the first VNF to the second VNF, where the scale-out notification message carries the scale-out magnitude parameter of the first VNF, and the scale-out magnitude parameter of the first VNF is used by the second VNF to determine whether the second VNF needs to be scaled out. The NFVO provided in this embodiment of the present invention can send, in time after obtaining a scale-out magnitude parameter of a first VNF, the scale-out magnitude parameter of the first VNF to a second VNF directly associated with the first VNF, so that when determining that a service processing capability of the second VNF is not sufficient for processing in time data traffic that is generated by the first VNF after scale-out, the second VNF can request in time a VNFM responsible for managing the second VNF to perform scale-out, thereby enhancing the service processing capability of the second VNF to ensure that the service processing capability of the second VNF is sufficient for processing in time the data traffic that is generated by the first VNF after the scale-out, avoiding service impact caused by the scale-out of the first VNF to the second VNF directly associated with the first VNF, and further reducing a service call loss.

Figure 11:
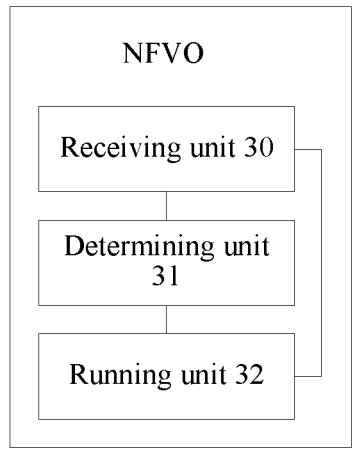
FIG. 11 is a schematic structural diagram of another NFVO according to an embodiment of the present invention.

As shown in FIG. 11, this embodiment of the present invention provides an NFVO. The NFVO may be a physical apparatus of the NFVO described in the embodiment shown in FIG. 5, or a physical apparatus in which a logical function module is located, where the logical function module is in an NFV system and can perform a method procedure that can be performed by the NFVO. The NFVO may also be presented in a form of a chip. The chip carries an application program that can implement the method procedure that can be performed by the second VNF.

The apparatus may include:

a receiving unit 30, configured to receive a resource request message of a first VNF, where the resource request message of the first VNF carries an identifier of the first VNF and a scale-out magnitude parameter of the first VNF;

a determining unit 31, configured to determine, according to a preset correspondence between an identifier of a VNF and a scale-out association script, a scale-out association script corresponding to the identifier of the first VNF received by the receiving unit 30, where the scale-out association script corresponding to the identifier of the first VFN is used to scale out a VNF that is among VNFs directly associated with the first VNF and that needs to be scaled out; and a running unit 32, configured to run, according to the scale-out magnitude parameter of the first VNF received by the receiving unit 30, the scale-out association script that is determined by the determining unit 31 and that corresponds to the identifier of the first VFN.

Optionally, the scale-out magnitude parameter of the first VNF received by the receiving unit 30 is used to indicate an increased service capacity of the first VNF after the first VNF is scaled out.

Optionally, the resource request message of the first VNF received by the receiving unit 30 further carries a scale-out sequence number identifier of the first VNF.

The determining unit 31 is further configured to: determine whether the receiving unit 30 has received a resource request message carrying the identifier of the first VNF and the scale-out sequence number identifier of the first VNF; and if the another resource request message has not been received, perform the step of determining, according to a preset correspondence between an identifier of a VNF and a scale-out association script, a scale-out association script corresponding to the identifier of the first VNF.

This embodiment of the present invention provides an NFVO. The NFVO can receive a resource request message of a first VNF, where the resource request message of the first VNF carries an identifier of the first VNF and a scale-out magnitude parameter of the first VNF, determine, according to a preset correspondence between an identifier of a VNF and a scale-out association script, a scale-out association script corresponding to the identifier of the first VNF, and run, according to the scale-out magnitude parameter of the first VNF, the scale-out association script corresponding to the identifier of the first VFN, where the scale-out association script corresponding to the identifier of the first VFN is used to scale out a VNF that is among VNFs directly associated with the first VNF and that needs to be scaled out. According to the NFVO provided in this embodiment of the present invention, a scale-out association script is set in the NFVO, so that when the NFVO determines that a first VNF requests scale-out, the NFVO can run a scale-out association script of the first VNF according to a scale-out magnitude parameter of the first VNF, thereby implementing a scale-out operation on a VNF directly associated with the first VNF, enhancing a service processing capability of the VNF directly associated with the first VNF, to ensure that the service processing capability of the VNF directly associated with the first VNF is sufficient for processing in time data traffic that is generated by the first VNF after scale-out, avoiding service impact caused by the scale-out of the first VNF to the VNF directly associated with the first VNF, and further reducing a service call loss.

Embodiment 4

Figure 12:
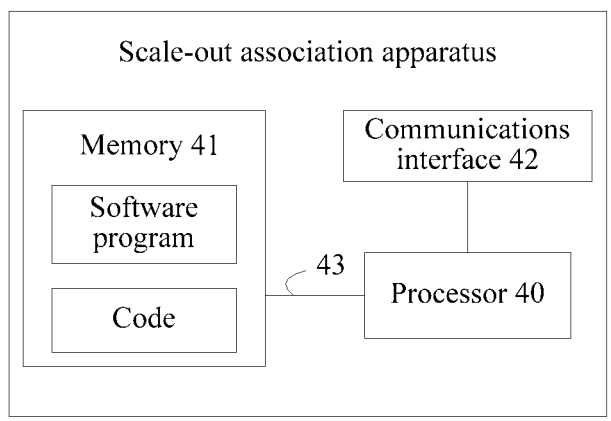
FIG. 12 is a schematic diagram of a hardware structure of a scale-out association apparatus according to an embodiment of the present invention.

As shown in FIG. 12, this embodiment of the present invention provides a scale-out association apparatus. The scale-out association apparatus may be a physical apparatus in which the second VNF in the foregoing embodiments is located, or a physical apparatus that can communicate with a physical apparatus in which the second VNF is located. The apparatus can perform a method procedure that can be performed by the second VNF. Specifically, the apparatus may include a processor 40, a memory 41, a communications interface 42, and a system bus 43. The processor 40, the memory 41, and the communications interface 42 are connected and communicate with each other by using the system bus 43.

The processor 40 may be a central processing unit (CPU), an application specific integrated circuit (ASIC), or one or more integrated circuits configured to implement this embodiment of the present invention.

The memory 41 may include a volatile memory, for example, a random-access memory (RAM). Alternatively, the memory 41 may include a non-volatile memory, for example, a read-only memory (ROM), a flash memory, a hard disk drive (HDD), or a solid-state drive (SSD). Alternatively, the memory 41 may include a combination of the foregoing types of memories.

The communications interface 42 is configured to interact with another node, for example, interact with a function node such as a VNFM or an NFVO.

When the scale-out association apparatus is running, the processor 40 and the memory 41 may perform the method procedure shown in any accompanying drawing of FIG. 2, FIG. 4, or FIG. 6A and FIG. 6B to FIG. 8A and FIG. 8B, and the following is specifically included.

The processor 40 is configured to receive a scale-out notification message of a first VNF by using the communications interface 42, where the scale-out notification message of the first VNF carries a scale-out magnitude parameter of the first VNF, the scale-out magnitude parameter of the first VNF is used by the processor 40 to determine whether a second VNF needs to be scaled out, and the first VNF is directly associated with the second VNF. The processor 40 is further configured to: determine, according to the scale-out magnitude parameter of the first VNF and a service processing capability of the second VNF, whether the second VNF needs to be scaled out, and send a scale-out request message to a VNFM by using the communications interface 42 if the processor 40 determines that the second VNF needs to be scaled out, where the scale-out request message is used to request to scale out the second VNF.

The memory 41 is configured to: store code of the scale-out notification message of the first VNF, code of the scale-out magnitude parameter of the first VNF, code of the service processing capability of the second VNF, code of the scale-out request message, and a software program for controlling the processor 40 to complete the foregoing process, so that the processor 40 completes the foregoing process by performing the software program and invoking the code of the scale-out notification message of the first VNF, the code of the scale-out magnitude parameter of the first VNF, the code of the service processing capability of the second VNF, and the code of the scale-out request message.

Optionally, the scale-out magnitude parameter of the first VNF received by the processor 40 is used to indicate an increased service capacity of the first VNF after the first VNF is scaled out.

Optionally, the processor 40 is further configured to obtain a scale-out parameter of the second VNF according to the scale-out magnitude parameter of the first VNF if the processor 40 determines that the second VNF needs to be scaled out, where the scale-out parameter indicates a resource that needs to be added to the second VNF.

The scale-out request message carries the scale-out parameter of the second VNF.

Optionally, the processor 40 is specifically configured to: determine whether the service processing capability of the second VNF satisfies the scale-out magnitude parameter of the first VNF; and if the service processing capability of the second VNF satisfies the scale-out magnitude parameter of the first VNF, determine that the second VNF does not need to be scaled out; or if the service processing capability of the second VNF does not satisfy the scale-out magnitude parameter of the first VNF, determine that the second VNF needs to be scaled out.

Optionally, the processor 40 is specifically configured to receive the scale-out notification message of the first VNF sent by a network functions virtualization orchestrator NFVO.

Optionally, the scale-out request message sent by the processor 40 carries a scale-out magnitude parameter of the second VNF, the scale-out magnitude parameter of the second VNF is determined by the processor 40 according to the scale-out magnitude parameter of the first VNF, and the scale-out magnitude parameter of the second VNF is used to indicate an increased service capacity of the second VNF after the second VNF is scaled out.

Optionally, the processor 40 is specifically configured to receive the scale-out notification message of the first VNF sent by the first VNF.

Optionally, the processor 40 is further configured to: after sending the scale-out request message, send a scale-out notification message of the second VNF to a fourth VNF directly associated with the second VNF, where the scale-out notification message of the second VNF carries the scale-out magnitude parameter of the second VNF, the scale-out magnitude parameter of the second VNF is determined by the processor 40 according to the scale-out magnitude parameter of the first VNF, and the scale-out magnitude parameter of the second VNF is used by the fourth VNF to determine whether the fourth VNF needs to be scaled out.

Optionally, the processor 40 is further configured to: determine whether another scale-out notification message carrying an identifier of the first VNF and a scale-out sequence number identifier of the first VNF has been received; and if the another scale-out notification message has not been received, perform the step of determining, according to the scale-out magnitude parameter of the first VNF and a service processing capability of the second VNF, whether the second VNF needs to be scaled out.

Optionally, the scale-out request message sent by the processor 40 to the VNFM or the scale-out notification message of the second VNF sent by the processor 40 to the fourth VNF further carries an identifier of the second VNF and a scale-out sequence number identifier of the second VNF.

This embodiment of the present invention provides a scale-out association apparatus. The scale-out association apparatus can receive a scale-out notification message of a first VNF, determine, according to a scale-out magnitude parameter of the first VNF carried in the scale-out notification message of the first VNF and according to a service processing capability of a second VNF, whether the second VNF needs to be scaled out, and send a scale-out request message if the apparatus determines that the second VNF needs to be scaled out, where the scale-out request message is used to request to scale out the second VNF, the scale-out magnitude parameter of the first VNF is used to determine whether the second VNF needs to be scaled out, and the first VNF is directly associated with the second VNF. The scale-out association apparatus can receive in time a scale-out notification message of a first VNF and learn that the first VFN is to be scaled out. When determining, according to a scale-out magnitude parameter of the first VNF, that a second VNF also needs to be scaled out, the scale-out association apparatus can request a VNFM responsible for managing the second VNF to perform scale-out, thereby enhancing a service processing capability of the second VNF in time to ensure that the service processing capability of the second VNF is sufficient for processing in time data traffic that is generated by the first VNF after scale-out, avoiding service impact caused by the scale-out of the first VNF to the second VNF directly associated with the first VNF, and further reducing a service call loss.

Figure 13:
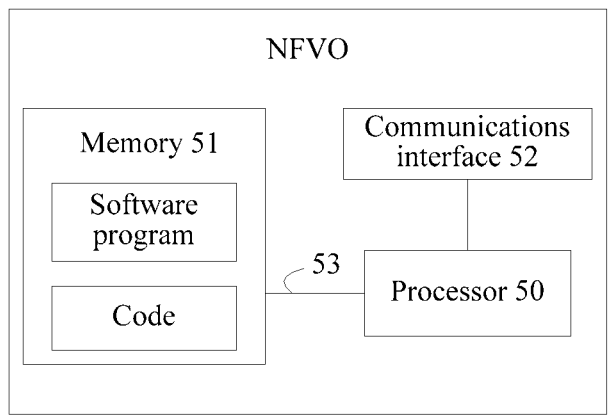
FIG. 13 is a schematic diagram of a hardware structure of an NFVO according to an embodiment of the present invention.

As shown in FIG. 13, this embodiment of the present invention provides an NFVO. The NFVO may be a physical apparatus in which the NFVO in the foregoing embodiments is located, or a physical apparatus having a function of the NFVO in the foregoing embodiments. Specifically, the NFVO may include a processor 50, a memory 51, a communications interface 52, and a system bus 53. The processor 50, the memory 51, and the communications interface 52 are connected and communicate with each other by using the system bus 53.

The processor 50 may be a CPU, an ASIC, or one or more integrated circuits configured to implement this embodiment of the present invention.

The memory 51 may include a volatile memory, for example, a RAM. Alternatively, the memory 51 may include a non-volatile memory, for example, a ROM, a flash memory, an HDD, or an SSD. Alternatively, the memory 51 may include a combination of the foregoing types of memories.

The communications interface 52 is configured to interact with another node, for example, interact with a VNFM or a VNF.

When the NFVO is running, the processor 50 and the memory 51 may perform the method procedure shown in any accompanying drawing of FIG. 4, or FIG. 6A and FIG. 6B to FIG. 8A and FIG. 8B, and the following is specifically included.

The processor 50 is configured to: receive a resource request message of a first virtualized network function VNF, where the resource request message of the first VNF carries an identifier of the first VNF and a scale-out magnitude parameter of the first VNF; determine, according to the identifier of the first VNF, a second VNF directly associated with the first VNF; and send a scale-out notification message of the first VNF to the second VNF, where the scale-out notification message of the first VNF carries the scale-out magnitude parameter of the first VNF, the scale-out magnitude parameter of the first VNF is used by the second VNF to determine whether the second VNF needs to be scaled out, and the first VNF is a VNF initiating a scale-out operation.

The memory 51 is configured to: store code of the identifier of the first VNF, code of the scale-out magnitude parameter of the first VNF, code of the scale-out notification message of the first VNF, and a software program for controlling the processor 50 to complete the foregoing process, so that the processor 50 completes the foregoing process by performing the software program and invoking the code of the identifier of the first VNF, the code of the scale-out magnitude parameter of the first VNF, and the code of the scale-out notification message of the first VNF.

Optionally, the processor 50 is specifically configured to query, according to the identifier of the first VNF, a preset association list for the second VNF directly associated with the first VNF.

Optionally, the resource request message of the first VNF received by the processor 50 further carries a scale-out sequence number identifier of the first VNF.

Optionally, the scale-out notification message of the first VNF sent by the processor 50 further carries the scale-out sequence number identifier of the first VNF, and the scale-out sequence number identifier of the first VNF is used by the second VNF to determine whether another scale-out notification message carrying the scale-out sequence number identifier of the first VNF has been received.

This embodiment of the present invention provides an NFVO. The NFVO can receive a resource request message of a first virtualized network function VNF, where the resource request message of the first VNF carries an identifier of the first VNF and a scale-out magnitude parameter of the first VNF, determine, according to the identifier of the first VNF, a second VNF directly associated with the first VNF, and send a scale-out notification message of the first VNF to the second VNF, where the scale-out notification message carries the scale-out magnitude parameter of the first VNF, and the scale-out magnitude parameter of the first VNF is used by the second VNF to determine whether the second VNF needs to be scaled out. The NFVO provided in this embodiment of the present invention can send, in time after obtaining a scale-out magnitude parameter of a first VNF, the scale-out magnitude parameter of the first VNF to a second VNF directly associated with the first VNF, so that when determining that a service processing capability of the second VNF is not sufficient for processing in time data traffic that is generated by the first VNF after scale-out, the second VNF can request in time a VNFM responsible for managing the second VNF to perform scale-out, thereby enhancing the service processing capability of the second VNF to ensure that the service processing capability of the second VNF is sufficient for processing in time the data traffic that is generated by the first VNF after the scale-out, avoiding service impact caused by the scale-out of the first VNF to the second VNF directly associated with the first VNF, and further reducing a service call loss.

Figure 14:
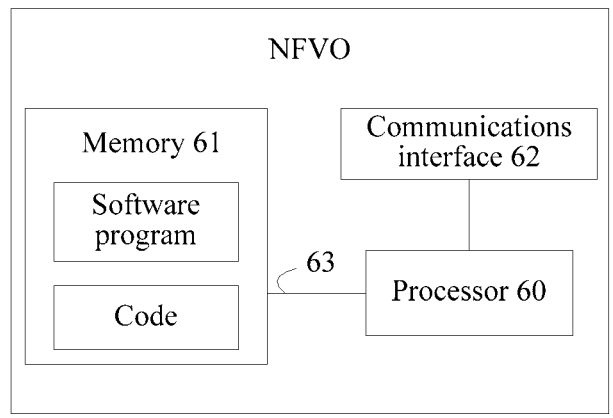
FIG. 14 is a schematic diagram of a hardware structure of another NFVO according to an embodiment of the present invention.

As shown in FIG. 14, this embodiment of the present invention provides an NFVO. The NFVO may be a physical apparatus in which the NFVO described in the embodiment shown in FIG. 5 is located, or a physical apparatus having a function of the NFVO described in the embodiment shown in FIG. 5. Specifically, the NFVO may include a processor 60, a memory 61, a communications interface 62, and a system bus 63. The processor 60, the memory 61, and the communications interface 62 are connected and communicate with each other by using the system bus 63.

The processor 60 may be a CPU, an ASIC, or one or more integrated circuits configured to implement this embodiment of the present invention.

The memory 61 may include a volatile memory, for example, a RAM. Alternatively, the memory 61 may include a non-volatile memory, for example, a ROM, a flash memory, an HDD, or an SSD. Alternatively, the memory 61 may include a combination of the foregoing types of memories.

The communications interface 62 is configured to interact with another node, for example, interact with a function node such as a VNFM or a VNF.

When the NFVO is running, the processor 60 and the memory 61 may perform the method procedure in FIG. 5, and the following is specifically included.

The processor 60 is configured to: receive a resource request message of a first virtualized network function VNF, where the resource request message of the first VNF carries an identifier of the first VNF and a scale-out magnitude parameter of the first VNF; determine, according to a preset correspondence between an identifier of a VNF and a scale-out association script, a scale-out association script corresponding to the identifier of the first VNF; and run, according to the scale-out magnitude parameter of the first VNF, the scale-out association script corresponding to the identifier of the first VFN, where the first VNF is a VNF proactively initiating a scale-out operation, and the scale-out association script corresponding to the identifier of the first VFN is used to scale out a VNF that is among VNFs directly associated with the first VNF and that needs to be scaled out.

The memory 61 is configured to: store code of the identifier of the first VNF, code of the scale-out magnitude parameter of the first VNF, code of the scale-out association script corresponding to the identifier of the first VFN, and a software program for controlling the processor 60 to complete the foregoing process, so that the processor 60 completes the foregoing process by performing the software program and invoking the code of the identifier of the first VNF, the code of the scale-out magnitude parameter of the first VNF, and the code of the scale-out association script corresponding to the identifier of the first VFN.

Optionally, the scale-out magnitude parameter of the first VNF received by the processor 60 is used to indicate an increased service capacity of the first VNF after the first VNF is scaled out.

Optionally, the resource request message of the first VNF received by the processor 60 further carries a scale-out sequence number identifier of the first VNF.

The processor 60 is further configured to: determine whether a resource request message carrying the identifier of the first VNF and the scale-out sequence number identifier of the first VNF has been received; and if the another resource request message has not been received, perform the step of determining, according to a preset correspondence between an identifier of a VNF and a scale-out association script, a scale-out association script corresponding to the identifier of the first VNF.

This embodiment of the present invention provides an NFVO. The NFVO can receive a resource request message of a first virtualized network function VNF, where the resource request message of the first VNF carries an identifier of the first VNF and a scale-out magnitude parameter of the first VNF, determine, according to a preset correspondence between an identifier of a VNF and a scale-out association script, a scale-out association script corresponding to the identifier of the first VNF, and run, according to the scale-out magnitude parameter of the first VNF, the scale-out association script corresponding to the identifier of the first VFN, where the scale-out association script corresponding to the identifier of the first VFN is used to scale out a VNF that is among VNFs directly associated with the first VNF and that needs to be scaled out. According to the NFVO provided in this embodiment of the present invention, a scale-out association script is set in the NFVO, so that when the NFVO determines that a first VNF requests scale-out, the NFVO can run a scale-out association script of the first VNF according to a scale-out magnitude parameter of the first VNF, thereby implementing a scale-out operation on a VNF directly associated with the first VNF, enhancing a service processing capability of the VNF directly associated with the first VNF, to ensure that the service processing capability of the VNF directly associated with the first VNF is sufficient for processing in time data traffic that is generated by the first VNF after scale-out, avoiding service impact caused by the scale-out of the first VNF to the VNF directly associated with the first VNF, and further reducing a service call loss.

Embodiment 5

Figure 15:
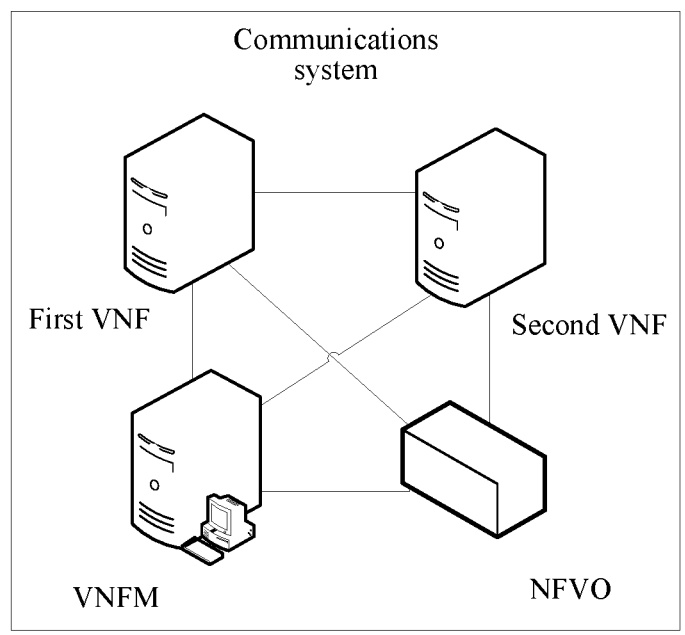
FIG. 15 is a block diagram of a communications system according to an embodiment of the present invention.

As shown in FIG. 15, this embodiment of the present invention provides a communications system. The communications system may include the scale-out association apparatus shown in FIG. 9, the NFVO shown in FIG. 10, and a first VNF. Alternatively, the communications system may include the scale-out association apparatus shown in FIG. 9, the NFVO shown in FIG. 11, and a first VNF. Alternatively, the communications system may include the scale-out association apparatus shown in FIG. 12, the NFVO shown in FIG. 13, and a first VNF. Alternatively, the communications system may include the scale-out association apparatus shown in FIG. 12, the NFVO shown in FIG. 14, and a first VNF.

Both the scale-out association apparatus shown in FIG. 9 and the scale-out association apparatus shown in FIG. 12 may be referred to as second VNFs.

In the communications system provided in this embodiment of the present invention, a second VNF can receive a scale-out notification message of a first VNF, determine, according to a scale-out magnitude parameter of the first VNF carried in the scale-out notification message of the first VNF and according to a service processing capability of the second VNF, whether the second VNF needs to be scaled out, and send a scale-out request message to a VNFM if the second VNF determines that the second VNF needs to be scaled out, where the scale-out request message is used to request to scale out the second VNF, the scale-out magnitude parameter of the first VNF is used to determine whether the second VNF needs to be scaled out, and the first VNF is directly associated with the second VNF; and an NFVO can receive a resource request message of a first virtualized network function VNF, where the resource request message of the first VNF carries an identifier of the first VNF and a scale-out magnitude parameter of the first VNF, determine, according to the identifier of the first VNF, a second VNF directly associated with the first VNF, and send a scale-out notification message of the first VNF to the second VNF, where the scale-out notification message carries the scale-out magnitude parameter of the first VNF.

Optionally, in the communications system provided in this embodiment of the present invention, after receiving a resource request message of a first virtualized network function VNF, an NFVO can further determine, according to a preset correspondence between an identifier of a VNF and a scale-out association script, a scale-out association script corresponding to an identifier of the first VNF, and run, according to a scale-out magnitude parameter of the first VNF, the scale-out association script corresponding to the identifier of the first VFN, where the scale-out association script corresponding to the identifier of the first VFN is used to scale out a VNF that is among VNFs directly associated with the first VNF and that needs to be scaled out.

This embodiment of the present invention provides a communications system. After a first VNF initiates a scale-out operation, the communications system can determine a second VNF directly associated with the first VNF and determine, according to a scale-out magnitude parameter of the first VNF and a service processing capability of the second VNF, whether the second VNF also needs to be scaled out, so that when it is determined that the service processing capability of the second VNF is not sufficient for processing in time data traffic that is generated by the first VNF after scale-out, the second VNF can be scaled out, thereby enhancing the service processing capability of the second VNF to ensure that the service processing capability of the second VNF is sufficient for processing in time the data traffic that is generated by the first VNF after the scale-out, avoiding service impact caused by the scale-out of the first VNF to the second VNF directly associated with the first VNF, and further reducing a service call loss.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of the present invention. The foregoing storage medium includes: any medium that can store program code, such as a USB flash drive, a read-only memory (ROM), a random access memory (RAM), a magnetic disk, or an optical disk.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A scale-out association method, comprising:
    receiving, by a second virtualized network function (VNF), a scale-out notification message of a first VNF sent by the first VNF after the first VNF initiated a scale-out operation, wherein the scale-out notification message of the first VNF carries a scale-out magnitude parameter of the first VNF, the scale-out magnitude parameter of the first VNF indicates a service capacity of the first VNF after the first VNF is scaled out and is used by the second VNF to determine whether the second VNF is to be scaled out, and the first VNF is directly associated with the second VNF which means data flow between the first VNF and the second VNF without transiting through another VNF;
    determining, by the second VNF, whether a service processing capability of the second VNF satisfies the scale-out magnitude parameter of the first VNF;
        if the service processing capability of the second VNF satisfies the scale-out magnitude parameter of the first VNF, determining, by the second VNF, that the second VNF does not need to be scaled out; and
        if the service processing capability of the second VNF does not satisfy the scale-out magnitude parameter of the first VNF, determining, by the second VNF, that the second VNF is to be scaled out; and
    sending, by the second VNF, a scale-out request message to a virtualized network function manager (VNFM) to request to scale out the second VNF.

2. The scale-out association method according to claim 1, wherein
    the scale-out magnitude parameter of the first VNF is a quantity of users who can be served by the first VNF or data traffic that can be generated by the first VNF after the first VNF is scaled out.

3. The scale-out association method according to claim 1, further comprising:
    obtaining, by the second VNF, a scale-out parameter of the second VNF according to the scale-out magnitude parameter of the first VNF, wherein the scale-out parameter indicates a resource that is to be added to the second VNF; and
    the scale-out request message carries the scale-out parameter of the second VNF.

4. The scale-out association method according to claim 1, wherein
    the scale-out request message carries a scale-out magnitude parameter of the second VNF, the scale-out magnitude parameter of the second VNF is determined by the second VNF according to the scale-out magnitude parameter of the first VNF, and the scale-out magnitude parameter of the second VNF indicates an increased service capacity of the second VNF after the second VNF is scaled out.

5. The scale-out association method according to claim 1, wherein after sending, by the second VNF, a scale-out request message, the method further comprises:
   sending, by the second VNF, a scale-out notification message of the second VNF to a fourth VNF, wherein the fourth VNF is directly associated with the second VNF which means data flow between the fourth VNF and the second VNF without transiting through another VNF, wherein the scale-out notification message of the second VNF carries the scale-out magnitude parameter of the second VNF, the scale-out magnitude parameter of the second VNF is determined by the second VNF according to the scale-out magnitude parameter of the first VNF, and the scale-out magnitude parameter of the second VNF is used by the fourth VNF to determine whether the fourth VNF is to be scaled out.

6. The scale-out association method according to claim 5, wherein
   the scale-out request message sent by the second VNF to the VNFM or the scale-out notification message of the second VNF sent by the second VNF to a fourth VNF further carries an identifier of the second VNF and a scale-out sequence number identifier of the second VNF.

7. The scale-out association method according to claim 1, wherein the scale-out notification message of the first VNF further carries an identifier of the first VNF and a scale-out sequence number identifier of the first VNF, and the method further comprises:
   determining, by the second VNF, whether another scale-out notification message carrying the identifier of the first VNF and the scale-out sequence number identifier of the first VNF has been received; and
   if the another scale-out notification message has not been received, performing the step of determining, by the second VNF, whether the second VNF is to be scaled out.

8. A scale-out association apparatus, comprising:
   a processor, configured to receive a scale-out notification message of a first virtualized network function (VNF) sent by the first VNF after the first VNF initiated a scale-out operation, wherein the scale-out notification message of the first VNF carries a scale-out magnitude parameter of the first VNF, the scale-out magnitude parameter of the first VNF indicates a service capacity of the first VNF after the first VNF is scaled out and is used by the processor to determine whether a second VNF is to be scaled out, and the first VNF is directly associated with the second VNF which means data flow between the first VNF and the second VNF without transiting through another VNF, wherein
   the processor is further configured to: determine whether a service processing capability of the second VNF satisfies the scale-out magnitude parameter of the first VNF,
      if the service processing capability of the second VNF satisfies the scale-out magnitude parameter of the first VNF, determine that the second VNF does not need to be scaled out; and
      if the service processing capability of the second VNF does not satisfy the scale-out magnitude parameter of the first VNF, determine that the second VNF is to be scaled out, and
   send a scale-out request message to a virtualized network function manager (VNFM), wherein the scale-out request message is used to request to scale out the second VNF.

9. The scale-out association apparatus according to claim 8, wherein
   the scale-out magnitude parameter of the first VNF received by the processor is a quantity of users who can be served by the first VNF or data traffic that can be generated by the first VNF after the first VNF is scaled out.

10. The scale-out association apparatus according to claim 8, wherein
    the processor is further configured to obtain a scale-out parameter of the second VNF according to the scale-out magnitude parameter of the first VNF, wherein the scale-out parameter indicates a resource that is to be added to the second VNF; and
    the scale-out request message carries the scale-out parameter of the second VNF.

11. The scale-out association apparatus according to claim 8, wherein
    the scale-out request message sent by the processor carries a scale-out magnitude parameter of the second VNF, the scale-out magnitude parameter of the second VNF is determined by the processor according to the scale-out magnitude parameter of the first VNF, and the scale-out magnitude parameter of the second VNF indicates an increased service capacity of the second VNF after the second VNF is scaled out.

12. The scale-out association apparatus according to claim 8, wherein
    the processor is further configured to: after sending the scale-out request message, send a scale-out notification message of the second VNF to a fourth VNF, wherein the fourth VNF is directly associated with the second VNF which means data flow between the fourth VNF and the second VNF without transiting through another VNF, wherein the scale-out notification message of the second VNF carries the scale-out magnitude parameter of the second VNF, the scale-out magnitude parameter of the second VNF is determined by the processor according to the scale-out magnitude parameter of the first VNF, and the scale-out magnitude parameter of the second VNF is used by the fourth VNF to determine whether the fourth VNF is to be scaled out.

13. The scale-out association apparatus according to claim 12, wherein
    the scale-out request message sent by the processor to the VNFM or the scale-out notification message of the second VNF sent by the processor to a fourth VNF further carries an identifier of the second VNF and a scale-out sequence number identifier of the second VNF.

14. The scale-out association apparatus according to claim 8, wherein
    the processor is further configured to: determine whether another scale-out notification message carrying an identifier of the first VNF and a scale-out sequence number identifier of the first VNF has been received; and
    if the another scale-out notification message has not been received, perform the step of determining whether the second VNF is to be scaled out.

* * * * *